US012579598B2

(12) United States Patent　　　(10) Patent No.:　US 12,579,598 B2
Ma et al.　　　(45) Date of Patent:　　Mar. 17, 2026

(54) EMBEDDING AND EXTRACTING WATERMARK IN VIDEO DATA

(71) Applicant: TENCENT TECHNOLOGY (SHENZHEN) COMPANY LIMITED, Shenzhen (CN)

(72) Inventors: Huaguan Ma, Shenzhen (CN); Zhaohong Chen, Shenzhen (CN); Jie Zhao, Shenzhen (CN); Xiaodong Cui, Shenzhen (CN); Lifu Wang, Shenzhen (CN); Wei Huang, Shenzhen (CN); Yicong Liu, Shenzhen (CN); Xin Li, Shenzhen (CN); Xiaoxia Pan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 666 days.

(21) Appl. No.: 17/951,898

(22) Filed: Sep. 23, 2022

(65) Prior Publication Data

US 2023/0008085 A1　　Jan. 12, 2023

Related U.S. Application Data

(63) Continuation of application No. PCT/CN2021/107107, filed on Jul. 19, 2021.

(30) Foreign Application Priority Data

Sep. 1, 2020　(CN) ......................... 202010906543.5

(51) Int. Cl.
　　　*G06T 1/00*　　　　(2006.01)
　　　*G06T 7/90*　　　　(2017.01)
　　　(Continued)

(52) U.S. Cl.
　　CPC .............. *G06T 1/0021* (2013.01); *G06T 7/90* (2017.01); *G06T 9/00* (2013.01); *G06V 10/431* (2022.01);
　　　(Continued)

(58) Field of Classification Search
　　CPC ........... G06T 1/0021; G06T 7/90; G06T 9/00; G06T 2207/10016; G06T 2207/10024;
　　　(Continued)

(56) References Cited

U.S. PATENT DOCUMENTS 7,523,311 B1 *　4/2009　Matsui ............... H04N 1/32309
　　　　　　　　　　　　　　　　　713/176
10,757,292 B1　　8/2020　Sung
　　　(Continued)

FOREIGN PATENT DOCUMENTS

CN　　　102282834 A　　12/2011
CN　　　102892048 A　　 1/2013
　　　(Continued)

OTHER PUBLICATIONS

China National Intellectual Property Administration (CNIPA) Office Action 1 for 202010906543.5 Mar. 31, 2021 26 Pages (including translation).

(Continued)

*Primary Examiner* — Christopher Wait
(74) *Attorney, Agent, or Firm* — Anova Law Group, PLLC

(57)　　　　　　　ABSTRACT

Disclosed in this application are a method for embedding a watermark in video data and apparatus, a method for extracting a watermark in video data and apparatus, a device, and a storage medium. The method for embedding the watermark includes: acquiring a target image frame in video data; performing time-frequency transformation on the target image frame to obtain target frequency domain data, the (Continued)

target frequency domain data comprising a matrix formed by frequency domain coefficients; changing the frequency domain coefficients in the target frequency domain data according to watermark data to obtain watermarked frequency domain data; performing inverse time-frequency transformation on the watermarked frequency domain data to obtain a watermarked image frame; and synthesizing watermarked video data according to the watermarked image frame.

17 Claims, 17 Drawing Sheets

(51) Int. Cl.
| | | |
|---|---|---|
| *G06T 9/00* | (2006.01) | |
| *G06V 10/42* | (2022.01) | |
| *G06V 20/40* | (2022.01) | |

(52) U.S. Cl.
CPC .... *G06V 20/46* (2022.01); *G06T 2207/10016* (2013.01); *G06T 2207/10024* (2013.01); *G06T 2207/20081* (2013.01); *G06T 2207/20132* (2013.01)

(58) Field of Classification Search
CPC . G06T 2207/20081; G06T 2207/20132; G06T 2201/0052; G06T 1/0057; G06T 1/0085; G06V 10/431; G06V 20/46; H04N 19/18; H04N 19/467; H04N 19/60; H04N 21/8358; H04N 21/44
See application file for complete search history.

(56) References Cited

U.S. PATENT DOCUMENTS

| | | | |
|---|---|---|---|
| 2002/0027612 A1* | 3/2002 | Brill | H04N 19/186 |
| | | | 348/473 |
| 2012/0093356 A1 | 4/2012 | Seshadri et al. | |
| 2017/0249715 A1 | 8/2017 | Lee et al. | |

FOREIGN PATENT DOCUMENTS

| | | | |
|---|---|---|---|
| CN | 106131373 A | 11/2016 | |
| CN | 106530205 A | 3/2017 | |
| CN | 107027055 A | 8/2017 | |
| CN | 107181957 A | 9/2017 | |
| CN | 108040189 A | 5/2018 | |
| CN | 111147864 A | 5/2020 | |
| CN | 111340676 A | 6/2020 | |
| CN | 112040337 A | 12/2020 | |
| WO | 0188883 A1 | 11/2001 | |

OTHER PUBLICATIONS

The World Intellectual Property Organization (WIPO) International Search Report for PCT/CN2021/107107 Oct. 27, 2021 7 Pages (including translation).
Junjie Wang. "Research on Digital Watermarking and Information Security Technology" Aug. 31, 2014, Intellectual Property Press.

* cited by examiner

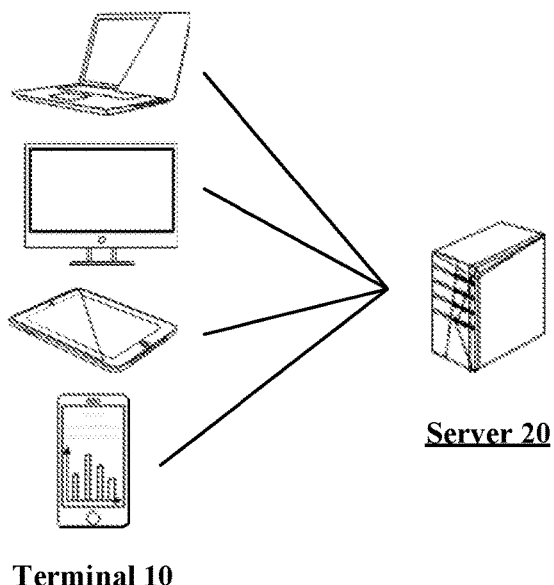

Server 20

Terminal 10

FIG. 1

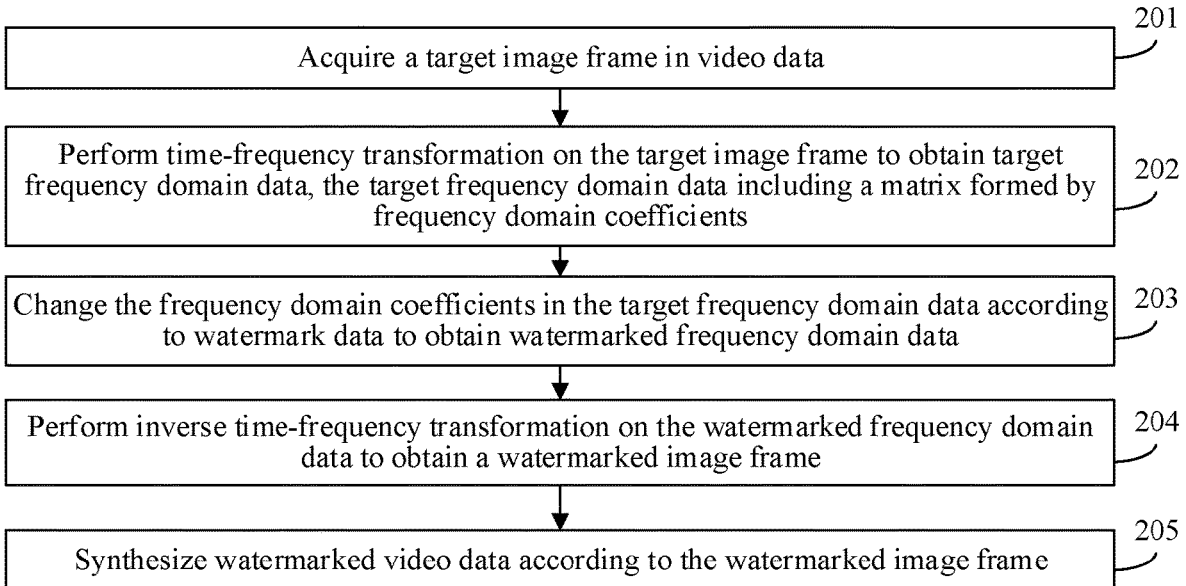

| | |
|---|---|
| Acquire a target image frame in video data | 201 |
| Perform time-frequency transformation on the target image frame to obtain target frequency domain data, the target frequency domain data including a matrix formed by frequency domain coefficients | 202 |
| Change the frequency domain coefficients in the target frequency domain data according to watermark data to obtain watermarked frequency domain data | 203 |
| Perform inverse time-frequency transformation on the watermarked frequency domain data to obtain a watermarked image frame | 204 |
| Synthesize watermarked video data according to the watermarked image frame | 205 |

FIG. 2

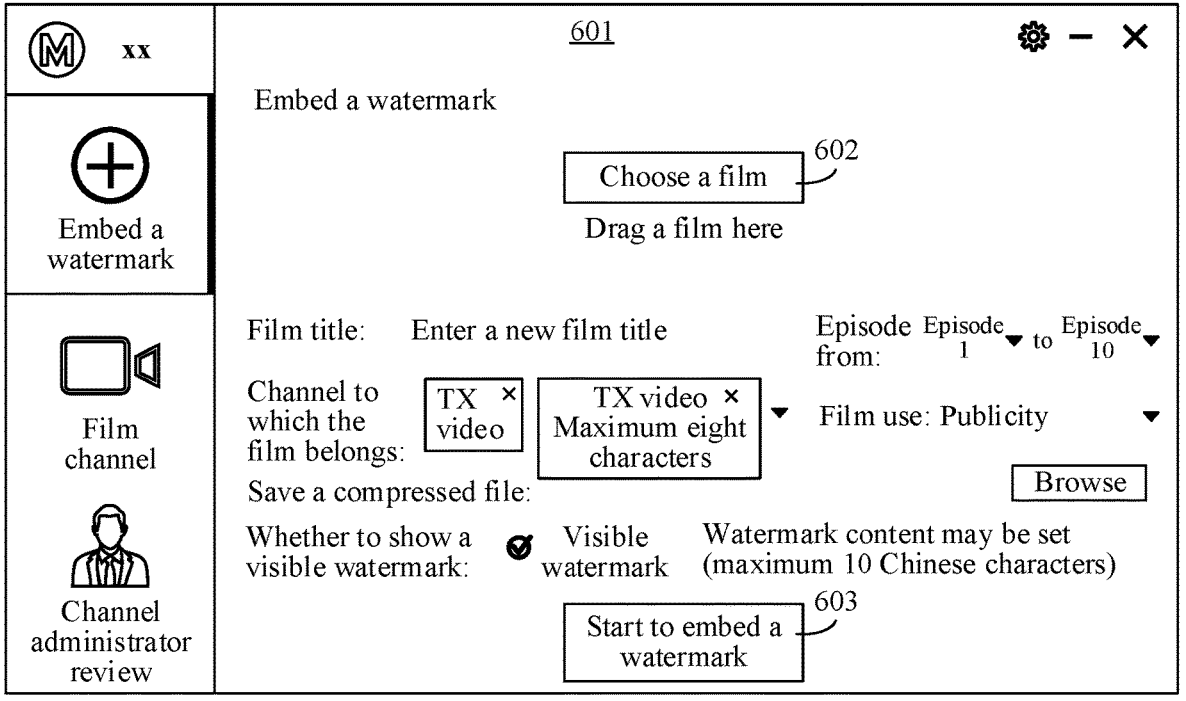
FIG. 3
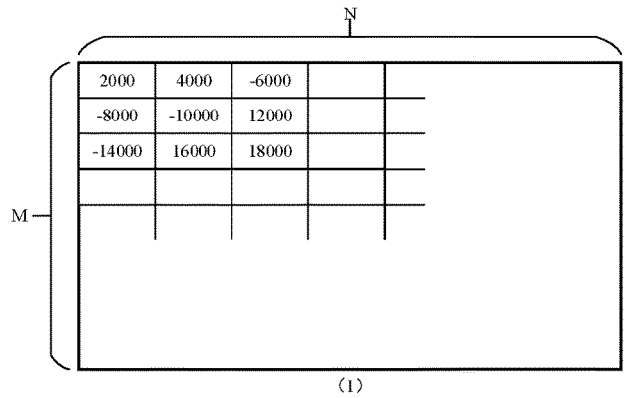
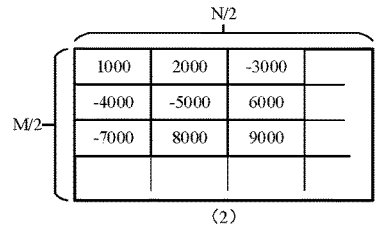
FIG. 4

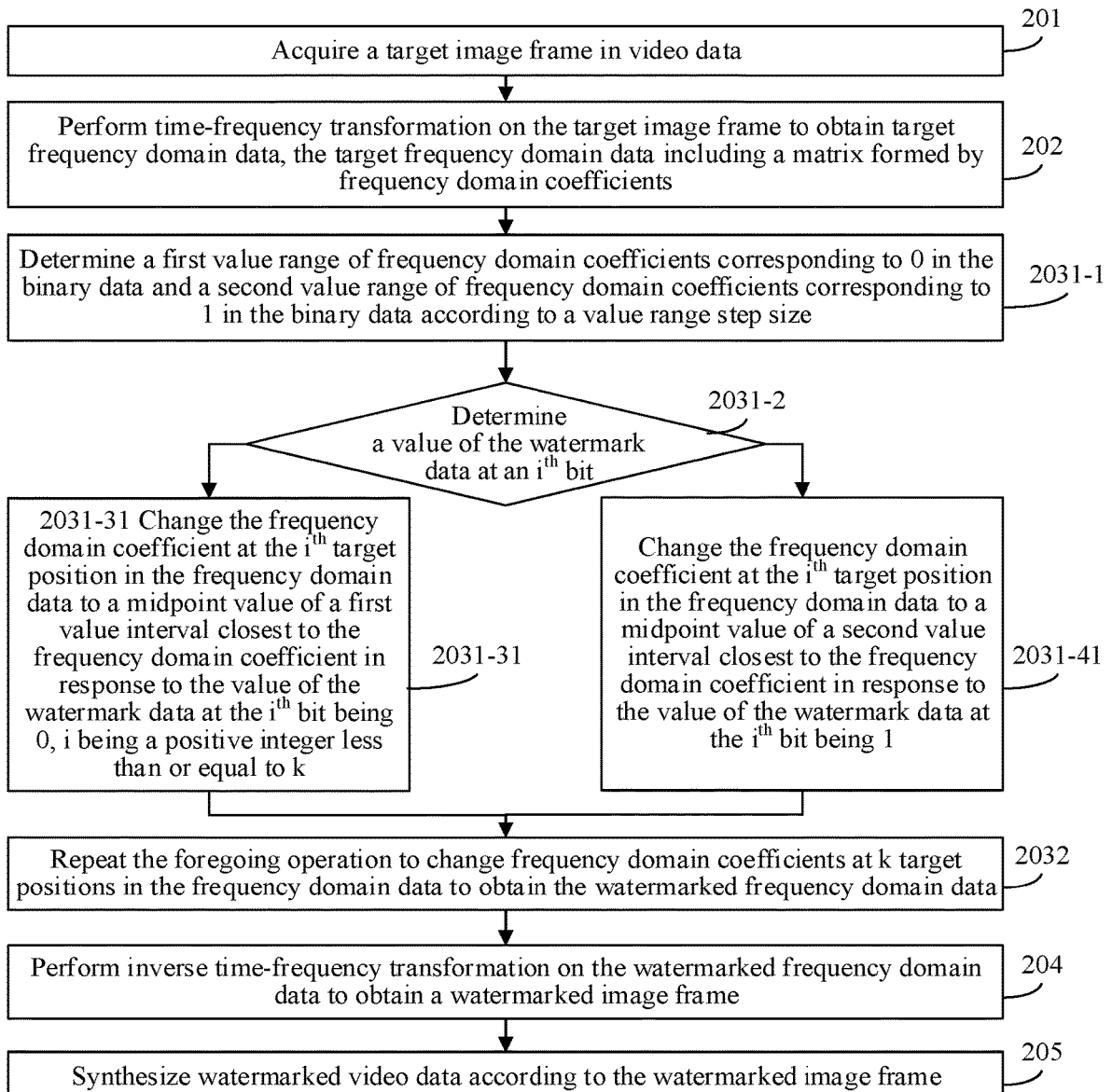

Acquire a target image frame in video data — 201

Perform time-frequency transformation on the target image frame to obtain target frequency domain data, the target frequency domain data including a matrix formed by frequency domain coefficients — 202

Determine a first value range of frequency domain coefficients corresponding to 0 in the binary data and a second value range of frequency domain coefficients corresponding to 1 in the binary data according to a value range step size — 2031-1

Determine a value of the watermark data at an $i^{th}$ bit — 2031-2

2031-31 Change the frequency domain coefficient at the $i^{th}$ target position in the frequency domain data to a midpoint value of a first value interval closest to the frequency domain coefficient in response to the value of the watermark data at the $i^{th}$ bit being 0, i being a positive integer less than or equal to k — 2031-31

Change the frequency domain coefficient at the $i^{th}$ target position in the frequency domain data to a midpoint value of a second value interval closest to the frequency domain coefficient in response to the value of the watermark data at the $i^{th}$ bit being 1 — 2031-41

Repeat the foregoing operation to change frequency domain coefficients at k target positions in the frequency domain data to obtain the watermarked frequency domain data — 2032

Perform inverse time-frequency transformation on the watermarked frequency domain data to obtain a watermarked image frame — 204

Synthesize watermarked video data according to the watermarked image frame — 205

FIG. 8

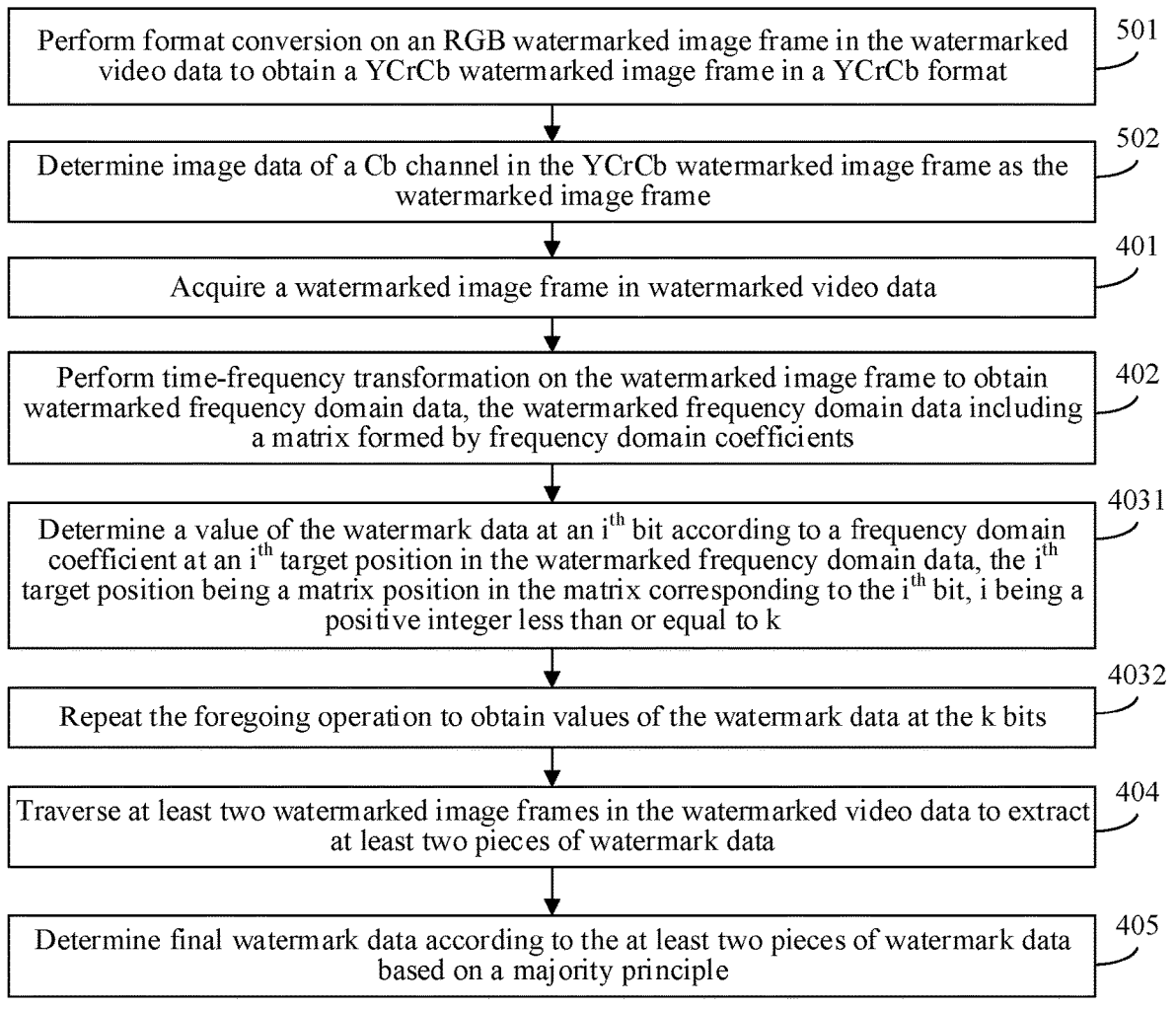

Perform format conversion on an RGB watermarked image frame in the watermarked video data to obtain a YCrCb watermarked image frame in a YCrCb format                                          501

Determine image data of a Cb channel in the YCrCb watermarked image frame as the watermarked image frame                                          502

Acquire a watermarked image frame in watermarked video data                                          401

Perform time-frequency transformation on the watermarked image frame to obtain watermarked frequency domain data, the watermarked frequency domain data including a matrix formed by frequency domain coefficients                                          402

Determine a value of the watermark data at an $i^{th}$ bit according to a frequency domain coefficient at an $i^{th}$ target position in the watermarked frequency domain data, the $i^{th}$ target position being a matrix position in the matrix corresponding to the $i^{th}$ bit, i being a positive integer less than or equal to k                                          4031

Repeat the foregoing operation to obtain values of the watermark data at the k bits                                          4032

Traverse at least two watermarked image frames in the watermarked video data to extract at least two pieces of watermark data                                          404

Determine final watermark data according to the at least two pieces of watermark data based on a majority principle                                          405

FIG. 11

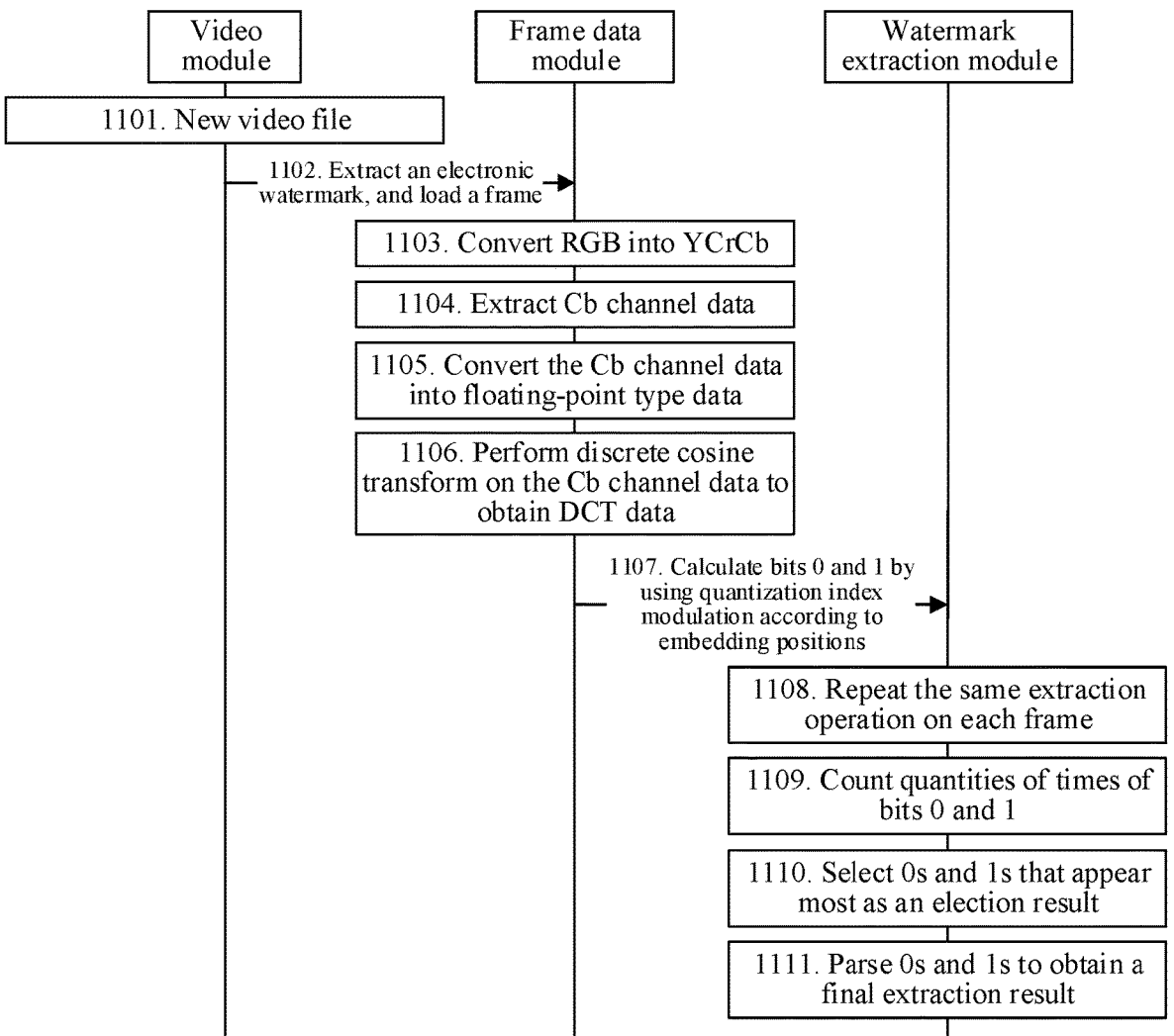

| Video module | Frame data module | Watermark extraction module |
| --- | --- | --- |

1101. New video file

1102. Extract an electronic watermark, and load a frame

1103. Convert RGB into YCrCb

1104. Extract Cb channel data

1105. Convert the Cb channel data into floating-point type data

1106. Perform discrete cosine transform on the Cb channel data to obtain DCT data 1107. Calculate bits 0 and 1 by using quantization index modulation according to embedding positions 1108. Repeat the same extraction operation on each frame 1109. Count quantities of times of bits 0 and 1

1110. Select 0s and 1s that appear most as an election result

1111. Parse 0s and 1s to obtain a final extraction result

FIG. 18

EMBEDDING AND EXTRACTING WATERMARK IN VIDEO DATA

RELATED APPLICATIONS

This application is a continuation of PCT Application No. PCT/CN2021/107107, filed on Jul. 19, 2021, which in turn claims priority to Chinese Patent Application No. 202010906543.5, entitled "METHOD FOR EMBEDDING WATERMARK IN VIDEO DATA AND APPARATUS, METHOD FOR EXTRACTING WATERMARK IN VIDEO DATA AND APPARATUS, DEVICE, AND STORAGE MEDIUM" and filed on Sep. 1, 2020. The two applications are both incorporated herein by reference in their entirety.

FIELD OF THE TECHNOLOGY

This application relates to the field of video editing, and in particular, to a method for embedding a watermark in video data and apparatus, a method for extracting a watermark in video data and apparatus, a device, and a storage medium.

BACKGROUND OF THE DISCLOSURE

A digital watermarking technology refers to the embedding of specific information in a digital signal. The digital signal may be audio, a picture, a video, or the like. When a signal with a digital watermark is copied, embedded information is copied as well. Digital watermarks may include a visible watermark and an invisible watermark. The visible watermark is a watermark that can be seen, and the invisible watermark is a watermark that cannot be seen.

A method for embedding an invisible digital watermark such as a spatial-domain least significant bit watermarking method is provided in the related art. In the spatial-domain least significant bit watermarking method, watermark data is added by changing the value at a least significant bit of a pixel value (binary) of an image, so that the watermark data can be embedded in data of the image. Since only the last bit of the pixel value is changed in the method, the change to the color is very small and a watermark can be hidden very well.

However, such a method is not robust, and it is difficult to extract a watermark effectively under compression, re-encoding and other attacks.

SUMMARY

Embodiments of this application provide a method for embedding a watermark in video data and apparatus, a method for extracting a watermark in video data and apparatus, a device, and a storage medium, so that the robustness of watermarks can be improved. The technical solutions are as follows.

One aspect of this application provides a method for embedding a watermark in video data is provided, applied to a computer device, the method including acquiring a target image frame in video data; performing time-frequency transformation on the target image frame to obtain target frequency domain data, the target frequency domain data comprising a matrix formed by frequency domain coefficients; changing the frequency domain coefficients in the target frequency domain data according to watermark data to obtain watermarked frequency domain data; performing inverse time-frequency transformation on the watermarked frequency domain data to obtain a watermarked image frame; and synthesizing watermarked video data according to the watermarked image frame.

Another aspect of this application provides a method for extracting a watermark in video data is provided, applied to a computer device, the method including acquiring a watermarked image frame in watermarked video data; performing time-frequency transformation on the watermarked image frame to obtain watermarked frequency domain data, the watermarked frequency domain data comprising a matrix formed by frequency domain coefficients; and extracting watermark data according to the frequency domain coefficients in the watermarked frequency domain data.

According to another aspect of this application, a non-transitory computer-readable storage medium, the storage medium storing at least one instruction, at least one program, a code set or an instruction set, the at least one instruction, the at least one program, the code set, or the instruction set being loaded or executed by a processor to implement the method for embedding or extracting a watermark in video data in the foregoing aspects.

The beneficial effects brought by the technical solutions provided in the embodiments of this application are at least as follows:

Time-frequency domain transformation is performed on at least one frame of image in a video to obtain a frequency domain matrix of each frame of image. A watermarked frequency domain matrix is obtained by embedding watermark data in the frequency domain matrix of each frame of image, and then inverse time-frequency domain transformation is performed on the watermarked frequency domain matrix to obtain an image. Accordingly, a watermark has been embedded in the image. The image is referred to as a watermarked image, and then the watermarked image is used to re-synthesize a video. An obtained video is a video embedded with a watermark. A watermark is embedded in a frequency domain signal of the image, so that the embedded watermark does not affect the imaging of the image and has relatively high robustness. Even if the watermarked image is under compression, rotation, translation, re-encoding, and other attacks, because the frequency domain signal has the characteristics of position invariance and linear transformation, the impact of these attacks on the frequency domain signal of the image is small, and a computer device can still successfully extract watermark data from the watermarked image. Moreover, since complete watermark data is embedded in a plurality of frames of image in this method, if watermark data of a part of the image is changed after a plurality of pieces of watermark data are extracted from the plurality of frames of image, the computer device can still determine actual watermark data based on the majority of the watermark data, thereby further improving the robustness of watermarks.

BRIEF DESCRIPTION OF THE DRAWINGS

FIG. 1 is a block diagram of an implementation environment according to an exemplary embodiment of this application.

FIG. 2 is a flowchart of a method for embedding a watermark in video data according to an exemplary embodiment of this application.

FIG. 3 is a schematic diagram of a user interface of a method for embedding a watermark in video data according to another exemplary embodiment of this application.

FIG. 4 is a schematic diagram of frequency domain data of a method for embedding a watermark in video data according to another exemplary embodiment of this application.

FIG. 8 is a flowchart of a method for embedding a watermark in video data according to another exemplary embodiment of this application.

FIG. 11 is a flowchart of a method for extracting a watermark in video data according to another exemplary embodiment of this application.

FIG. 18 is a flowchart of a method for extracting a watermark in video data according to another exemplary embodiment of this application.

DESCRIPTION OF EMBODIMENTS

Figure 5:
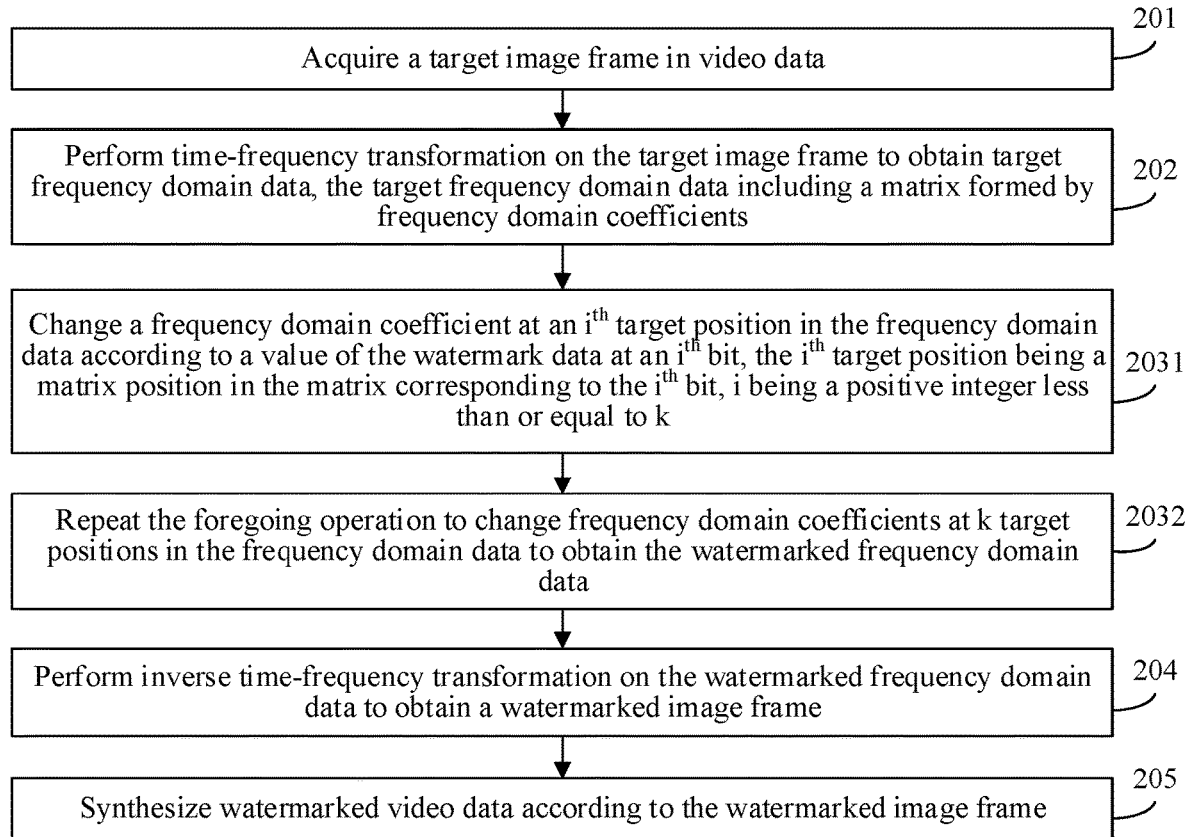
FIG. 5 is a flowchart of a method for embedding a watermark in video data according to another exemplary embodiment of this application.

To make the objectives, technical solutions, and advantages of this application clearer, the implementations of this application are further described below in detail with reference to the accompanying drawings.

First, the terms described in the embodiments of this application are briefly introduced.

Digital watermarking refers to the embedding of specific information in a digital signal. The digital signal may be audio, a picture, a video, or the like. When a signal with a digital watermark is copied, embedded information is copied as well. Digital watermarks may include a visible watermark and an invisible watermark. The visible watermark refers to a watermark that can be seen, and information included in the visible watermark can be seen when a picture or video is viewed. Generally, the visible watermark usually includes the name or sign of a copyrighter. In the invisible watermark, a part of data in a digital signal is changed to add a watermark. Such a change to the data in the digital signal is generally not easily perceivable.

A discrete cosine transform (DCT) is a transform defined for a real signal. A signal obtained in a frequency domain after transform is also a real signal. Compared with a discrete Fourier transform (DFT), the DCT can reduce more than half calculation. The DCT also has a very important property (an energy concentration characteristic): Energy in most natural signals (sound and images) concentrate in a low-frequency part after discrete cosine transform. Therefore, the DCT has been widely used in (sound and image) data compression. The DCT is another transform derived from DFT. Therefore, many attributes of the DFT are still kept in the DCT. For example, the discrete cosine transform is a transform related to a Fourier transform and is similar to a discrete Fourier transform. However, only a real number is used in the discrete cosine transform. The discrete cosine transform is equivalent to a discrete Fourier transform with a length twice as large. The discrete Fourier transform is performed on a real even function.

Quantization index modulation (QIM) is a quantization-based digital watermark algorithm. Different quantizers are selected according to different watermark data to quantize carrier data. For example, the main idea of the QIM algorithm is that original carrier data is quantized by a quantizer into different index intervals according to watermark information, and during watermark detection, watermark information is recognized according to a quantization index interval to which modulated data belongs.

Robustness refers to that after an original signal has undergone various unintended or intended signal processing, a watermark can still be completely recognized or can still be accurately authenticated. Common signal processing processes include channel noise, digital filtering, digital-to-analog conversion and analog-to-digital conversion, signal sampling, shift transformation, scale variation, lossy or lossless compression, and the like. For example, for a digital watermarking technology with adequate robustness, it is difficult for an attacker to damage or delete a watermark or counterfeit a copyright marker of data through common image processing (for example, data compression, low-pass filtering, high-pass filtering, image enhancement, sub-sampling, and sub-quantization), geometric transformation or geometric distortion (for example, cropping, scale expansion, translation, rotation, and distortion), noise interference (salt-and-pepper noise and Gaussian noise), overlapping of multiple watermarks, and other measures.

FIG. 1 is a schematic diagram of an implementation environment according to an embodiment of this application. The implementation environment may include a terminal 10 and a server 20.

The terminal 10 may be an electronic device such as a mobile phone, a desktop computer, a tablet computer, a game console, an e-book reader, a multimedia player device, a wearable device, a Moving Picture Experts Group Audio Layer III (MP3) player, a Moving Picture Experts Group Audio Layer IV (MP4) player, or a laptop portable computer. A client of an application program that can embed a watermark in a video or extract a watermark from a video may be installed in the terminal 10. The program is, for example, a video editing program, a video synthesis program, a watermark embedding program, a video sharing program, a video shooting program, or a watermark extraction program.

The terminal 10 includes a first memory and a first processor. A first program is stored in the first memory. The foregoing first program is invoked and executed by the first processor to implement a method for embedding a watermark in video data and a method for extracting a watermark in video data. The first memory may include, but is not limited to, several of the following: a random access memory (RAM), a read-only memory (ROM), a programmable read-only memory (PROM), an erasable programmable read-only memory (EPROM), and an electric erasable programmable read-only memory (EEPROM). The first processor may be formed by one or more integrated circuit chip sets. In some embodiments, the first processor may be a general-purpose processor, for example, a central processing unit (CPU) or a network processor (NP).

The server 20 is configured to provide a backend service to the client of the application program in the terminal 10. For example, the server 20 may be a backend server of the foregoing application program. The server 20 may be one server, or may be a server cluster formed by multiple servers, or may be a cloud computing service center.

The server 20 includes a second memory and a second processor. A second program is stored in the second memory. The foregoing second program is invoked by the second processor to implement the method for embedding a watermark in video data and the method for extracting a watermark in video data provided in this application. In some embodiments, the second memory may include, but is not limited to, several of the following: a RAM, a ROM, a PROM, an EPROM, and an EEPROM. In some embodiments, the second processor may be a general-purpose processor, for example, a CPU or an NP.

The terminal 10 and the server 20 may communicate with each other through a network. The network may be a wired network or may be a wireless network.

For example, the method for embedding a watermark in video data provided in this application may be completed separately by at least one computer device of a terminal or a server or completed together by a terminal and a server. The method for extracting a watermark in video data provided in this application may be completed separately by at least one computer device of a terminal or a server or completed together by a terminal and a server. For example, the terminal transmits video data to the server, and the server performs watermark embedding or watermark extraction.

FIG. 2 is a flowchart of a method for embedding a watermark in video data according to an exemplary embodiment of this application. The server may be performed by a computer device, for example, performed by a client or server shown in FIG. 1. The method includes the following steps:

Step 201: Acquire a target image frame in video data.

For example, the video data includes at least two frames of image (image frames). For example, the target image frame may be one image frame or several consecutive image frames within a period of time or a plurality of image frames extracted at fixed time intervals or all image frames of the video data. The target image frame may be all image frames in the video data or may be some image frames selected from all the image frames according to an extraction method. For example, the extraction method may be extracting one frame of image as a target image frame at intervals of two frames of image. For example, in this embodiment, the target image frame is all the images in the video data. That is, a watermark is embedded in every frame of image in the video data.

For example, when a device performing the method is a terminal, the video data may be video data shot by a camera module on the terminal or may be locally stored video data or may be video data (for example, a video stream) transmitted over a network. For example, when a device performing the method is a server, the video data may be video data locally stored on the server or may be video data uploaded by a terminal to the server.

For example, as shown in FIG. 3, when a user uses a video watermark embedding application program, a user interface 601 is displayed on the terminal. The user interface 601 is used for uploading video data in which a watermark needs to be embedded. The user may click a video addition control 602 to choose video data in which a watermark needs to be embedded. After video data is chosen, the user may click a watermark embedding control 603 to embed a watermark in the video data.

For example, the target image frame is image data for embedding a watermark. For example, after reading the video data, the computer device splits the video data into frames to obtain each frame of image of the video data, uses each frame of image as the target image frame, and embeds a watermark in the target image frame. For example, the following steps need to be performed to embed a watermark in one target image frame. The computer device traverses all target image frames to perform the following steps on each target image frame.

Step 202: Perform time-frequency transformation on the target image frame to obtain target frequency domain data, the target frequency domain data including a matrix formed by frequency domain coefficients.

For example, the watermark embedded in the video data in this embodiment is an invisible watermark. For the invisible watermark, after the watermark is embedded, the user cannot directly see the watermark from the picture of the video, and the watermark can be extracted from the video only by using a corresponding watermark extraction method.

For example, in this embodiment, for the video data, a watermark is embedded in a frequency domain of the video data. Compared with the embedding of a watermark in a video in a spatial domain (time domain) of the video data, the embedding of a watermark in a frequency domain has smaller impact. When a watermark is embedded in a spatial domain, a pixel value of a pixel in an image is changed. Through this method, after video data has undergone repeated copying, encoding, and compression, pixel values of pixels in the image may change in no regular pattern. As a result, the user cannot extract the watermark from the video data again, which is not beneficial to copyright tracking of the video data, making it impossible to effectively combat video piracy. When a watermark is embedded in a frequency domain, a value of an image in a time domain is changed. Even if video data has undergone repeated copying, offsetting, cropping, encoding, and compression, a value of an image in a video in a frequency domain does not change significantly, and the user can still extract the watermark from the video data again.

For example, the target image frame is spatial domain data, that is, data formed by pixel values. The target frequency domain data obtained after the target image frame has undergone time-frequency transformation is frequency domain data, that is, data formed by frequency domain coefficients.

For example, the time-frequency transformation includes discrete cosine transform. Discrete cosine transform is performed on the target image frame in this embodiment. A formula of the discrete cosine transform is as follows:

$$F(u, v) = \frac{2}{\sqrt{MN}} \alpha(u)\alpha(v) \sum_{x=0}^{N-1} \sum_{y=0}^{M-1} f(x, y) \cos\frac{(2x+1)u\pi}{2N} \cos\frac{(2y+1)v\pi}{2M},$$

$$\alpha(u) = \begin{cases} \frac{1}{\sqrt{2}}, & \text{if } u = 0 \\ 1, & \text{others} \end{cases},$$

where $\alpha(v) = \alpha(u)$; F(u, v) is outputted target frequency domain data; f(x, y) is an inputted target image frame; x=1, 2, 3, . . . , N−1; y=1, 2, 3, . . . , M−1; u=1, 2, 3, . . . , N−1; and v=1, 2, 3, . . . , M−1.

For example, the target frequency domain data is a matrix formed by frequency domain coefficients. For example, when the size of the target image frame is N*M pixels, the target frequency domain data is also a matrix with a size of N*M. Each element in the matrix is a frequency domain coefficient. That is, there are N*M frequency domain coefficients.

The discrete cosine transform has the characteristics of position invariance and linear transformation. For example, after an image is compressed, positions of frequency domain data of the image do not change, and changes in frequency domain data are linear. As shown in FIG. 4, (1) is frequency domain data of an original image, and (2) is frequency domain data of the image after ½ compression. In frequency domain data obtained after discrete cosine transform is performed on the image in a spatial domain, an area at an upper left corner is a low-frequency area, and an area at a lower right corner is a high-frequency area. After the image is compressed, the original image is compressed from a size of N*M into a size of (N/2)*(M/2). However, the compression has very small impact on frequency domain coefficients in the low-frequency area. As shown in FIG. 4, positions of the frequency domain coefficients do not change, and the values of the frequency domain coefficients are changed into ½ of original values.

Step 203: Change the frequency domain coefficients in the target frequency domain data according to watermark data to obtain watermarked frequency domain data.

For example, the watermark data may be provided by a user or may be automatically generated according to a user name of the user or may be default watermark data provided by an application program. The watermark data may be any one of a text, a number, a character or an image. For example, for the text or image, the text or image may be converted into a number, and frequency domain coefficients in the target frequency domain data are changed according to the number of the watermark data. For example, the image may be converted into a matrix formed by pixel values. A Chinese character may be converted into a sequence number or a Chinese character may be converted into an English text. An English text may be converted into a sequence number.

For example, the computer device may change the frequency domain coefficients according to the watermark data in any manner. For example, the watermark data may be converted into a binary number to obtain a binary character string (a string of 0s and 1s), and then a frequency domain coefficient at a specified position (a target position) in the target frequency domain data is changed according to the watermark data. For example, an even number is used to represent 0, and an odd number is used to represent 1. The watermark data may be embedded by correspondingly changing frequency domain coefficients at several specified positions into even numbers or odd numbers. For example, the watermark data is 0101. The watermark data is embedded in first four frequency domain coefficients in the target frequency domain data. The first four frequency domain coefficients are originally (1, 1, 3, 3). The frequency domain coefficients are correspondingly changed according to the odd or even numbers, so that it can be obtained that the changed frequency domain coefficients are (2, 1, 4, 3). In another example, the last number of each frequency domain coefficient is changed according to the watermark data. For example, the watermark data is 0101. The watermark data is embedded in first four frequency domain coefficients in the target frequency domain data. The first four frequency domain coefficients are originally (1111, 1111, 3333, 3333). The frequency domain coefficients are correspondingly changed according to the watermark data, so that it can be obtained that the changed frequency domain coefficients are (1110, 1111, 3330, 3331). Certainly, a person skilled in the art may further obtain other change methods based on the idea of the foregoing change.

For example, the watermarked frequency domain data is frequency domain data obtained after the watermark data is embedded in the target frequency domain data, that is, a matrix obtained after some frequency domain coefficients are changed.

Step 204: Perform inverse time-frequency transformation on the watermarked frequency domain data to obtain a watermarked image frame.

After the watermark data is embedded in the target frequency domain data, obtain the watermarked frequency domain data. Next, inverse time-frequency transformation is performed on the watermarked frequency domain data to obtain a watermarked image frame. The watermarked image frame is spatial domain data, that is, data formed by pixel values.

For example, the inverse time-frequency transformation includes inverse discrete cosine transform. A formula of the inverse discrete cosine transform is as follows:

$$f(x, y) =$$
$$\frac{2}{\sqrt{MN}} \sum_{u=0}^{N-1} \sum_{v=0}^{M-1} C(u)C(v)F(u, v) \cos\frac{(2x+1)u\pi}{2N} \cos\frac{(2y+1)v\pi}{2M},$$

$$C(u) = \begin{cases} \frac{1}{\sqrt{2}}, & \text{if } u = 0 \\ 1, & \text{others} \end{cases},$$

where C(v)=C(u); F(u, v) is inputted watermarked frequency domain data; f(x, y) is an outputted watermarked image frame; x=1, 2, 3, . . . , N−1; y=1, 2, 3, . . . , M−1; u=1, 2, 3, . . . , N−1; and v=1, 2, 3, . . . , M−1.

Step 205: Synthesize watermarked video data according to the watermarked image frame.

After the watermark data is added to the target image frame to obtain the watermarked image frame, the computer device synthesizes the watermarked video data by using the watermarked image frame. The watermarked video data is video data obtained after a watermark is embedded in at least one frame of image in the video data.

In summary, in the method provided in this embodiment, time-frequency domain transformation is performed on at least one frame of image in a video to obtain a frequency domain matrix of each frame of image. A watermarked frequency domain matrix is obtained by embedding watermark data in the frequency domain matrix of each frame of image, and then inverse time-frequency domain transformation is performed on the watermarked frequency domain matrix to obtain an image. Accordingly, a watermark has been embedded in the image. The image is referred to as a watermarked image, and then the watermarked image is used to re-synthesize a video. An obtained video is a video embedded with a watermark. A watermark is embedded in a frequency domain signal of the image, so that the embedded watermark does not affect the imaging of the image and has relatively high robustness. Even if the watermarked image is under compression, rotation, translation, re-encoding, and other attacks, because the frequency domain signal has the characteristics of position invariance and linear transformation, the impact of these attacks on the frequency domain signal of the image is small, and a computer device can still successfully extract watermark data from the watermarked image. Moreover, since complete watermark data is embedded in each frame of image and video data includes a plurality of frames of image in this method, if watermark data of a part of the image is changed after a plurality of pieces of watermark data are extracted from the plurality of frames of image, the computer device can still determine actual watermark data based on the majority of the watermark data, thereby further improving the robustness of watermarks.

For example, an exemplary embodiment of embedding watermark data in target frequency domain data is provided.

FIG. 5 is a flowchart of a method for embedding a watermark in video data according to an exemplary embodiment of this application. The server may be performed by a computer device, for example, performed by a client or server shown in FIG. 1. Based on the exemplary embodiment shown in FIG. 2, step 203 includes step 2031 and step 2032.

Step 2031: Change a frequency domain coefficient at an $i^{th}$ target position in the frequency domain data according to a value of the watermark data at an $i^{th}$ bit, the $i^{th}$ target position being a position in the matrix corresponding to the $i^{th}$ bit, i being a positive integer less than or equal to k.

For example, the watermark data occupies k bits, and k is a positive integer.

For example, the watermark data has k bits, that is, has k digits or characters. One bit of the watermark data corresponds to one target position in the frequency domain data, and the computer device changes a frequency domain coefficient at a target position according to the value of the watermark data at the bit.

For example, the target position is a position in the frequency domain data. For example, according to a matrix arrangement of the frequency domain data, a rectangular coordinate system may be established with the position of the first frequency domain coefficient in the upper left corner of the matrix as the origin (0, 0). The position of each frequency domain coefficient in the frequency domain data may be represented by using a coordinate position (x, y). For example, the target position includes at least one position in the frequency domain data. That is, at least one frequency domain coefficient may be correspondingly changed in the frequency domain data according to one bit in the watermark data. For example, the first bit corresponds to positions (4, 4), (4, 5), (5, 4), and (5, 5) in the frequency domain data.

For example, the size of the target image frame is N pixels*M pixels. The target image frame may be considered as a matrix that is formed by pixel values and has a size of N*M. After discrete cosine transform is performed on the target image frame, a matrix that is formed by frequency domain coefficients and has a size of N*M may be obtained. The matrix is the target frequency domain data. Therefore, the position in the matrix of the target image frame may be understood as the position of a pixel. Correspondingly, the position in the target frequency domain data is a position of each frequency domain coefficient in the matrix. For example, the position in the target frequency domain data represents a frequency. The frequency domain coefficient at this position represents a value of the target frequency domain data at the frequency. For example, frequencies represented by the positions in the target frequency domain data gradually increase from the upper left corner to the lower right corner of the matrix. That is, the area in the upper left corner is a low-frequency area, and the area in the lower right corner is a high-frequency area.

For example, for a target image frame with a size of 1 pixel*5 pixels, after discrete cosine transform is performed, a value of the obtained target frequency domain data at 1 Hz is 2, a value at 2 Hz is 4, a value at 3 Hz is 6, a value at 4 Hz is 8, and a value at 5 Hz is 10. A matrix (2, 4, 6, 8, 10) with a size of 1*5 may be obtained. The matrix is the target frequency domain data. A frequency domain coefficient 2 of the target frequency domain data at a position (1, 0) represents that the value at 1 Hz is 2, and a frequency domain coefficient 4 at a position (2, 0) represents that the value at 2 Hz is 4.

For example, the foregoing Step 2031 of changing a frequency domain coefficient at an $i^{th}$ target position in the frequency domain data according to a value of the watermark data at an $i^{th}$ bit, the $i^{th}$ target position being a position in the matrix corresponding to the $i^{th}$ bit, i being a positive integer less than or equal to k may be understood as: changing a frequency domain coefficient at an $i^{th}$ target frequency in the frequency domain data according to a value of the watermark data at an $i^{th}$ bit, the $i^{th}$ target frequency being a frequency in the matrix corresponding to the $i^{th}$ bit.

For example, the target position corresponding to each bit of the watermark data may be determined according to a preset rule. For example, a target position corresponding to the first bit of the watermark data and an interval may be specified, and the target position corresponding to each bit of the watermark data may be determined. For example, the target position corresponding to the first bit of the watermark data is (4, 4), and the interval is two transverse positions. A target position corresponding to the second bit is (7, 4), a target position corresponding to the third bit is (10, 4), . . . In this way, the target position corresponding to each bit of the watermark data may be determined. For example, in an image compression process, a low-frequency signal (a low-frequency area) of frequency domain data of an image is kept, and a part of a high-frequency signal (a high-frequency area) is filtered. Therefore, to ensure the robustness of a digital watermark algorithm, it is chosen to embed watermark data in the low-frequency area. For example, the low-frequency area and the high-frequency area of frequency domain data are relative descriptions, and there is no strict boundary for differentiation. Generally, the low-frequency area is at the upper left corner of a frequency domain data matrix, and the high-frequency area is at the lower right corner of the frequency domain data matrix.

Figure 6:
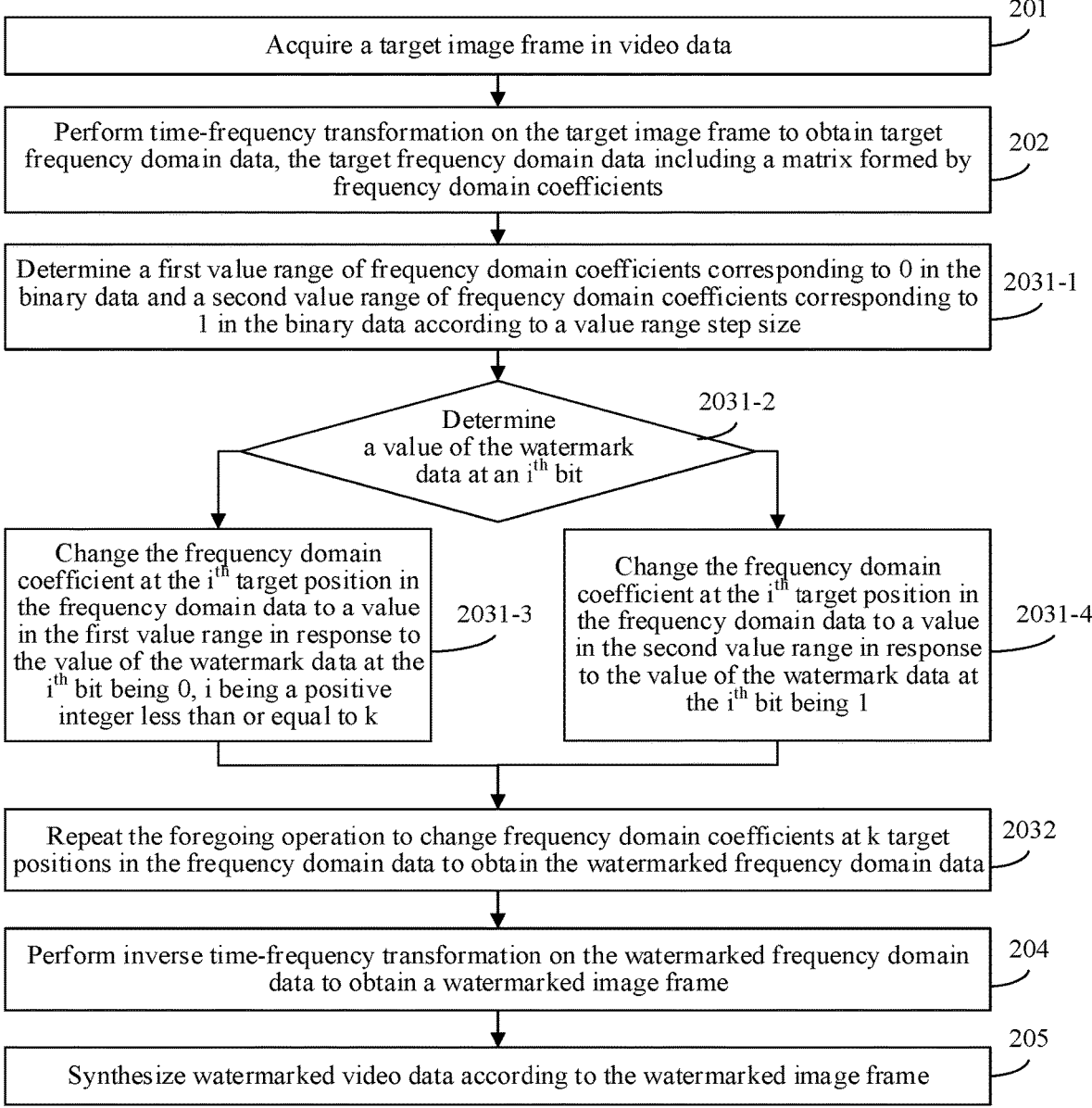
FIG. 6 is a flowchart of a method for embedding a watermark in video data according to another exemplary embodiment of this application.

For example, for a method for changing a frequency domain coefficient, some examples have been given in step 203. A method for changing a frequency domain coefficient by using quantization index modulation is further given below by using an example in which watermark data is binary data. As shown in FIG. 6, step 2031 further includes step 2031-1 to step 2031-4.

Step 2031-1: Determine a first value range of frequency domain coefficients corresponding to 0 in the binary data and a second value range of frequency domain coefficients corresponding to 1 in the binary data according to a value range step size.

For example, the value range step size is a preset fixed value. For example, the value of the value range step size affects the amplitude of changing frequency domain data by the embedded watermark data, the robustness of the watermark data, and the accuracy of the watermark data during extraction. Therefore, the value range step size is set to an appropriate value. For example, the value range step size is 1000.

For example, when the original watermark data is data in another form, the computer device may convert the watermark data into binary data. For example, when the watermark data is a Chinese character, the computer device first converts the watermark data into an English text. Next, 1 to 26 in the decimal system are used to respectively number 26 English letters. Next, a number in the decimal system is converted into a number in the binary system. Each English letter corresponds to binary data of five bits. For example, the watermark data is an English text "TENCENT", which is converted into numbers (20, 5, 14, 3, 5, 14, 20) in the decimal system. The numbers are converted into the binary system to obtain a character string of 0s and 1s: 10100 0010101110 00011 00101 01110 10100. Watermark data of 35 bits is obtained. For example, the computer device changes a frequency domain coefficient according to the binary watermark data of 35 bits. For example, if the watermark data includes a character or a foreign text, the character or foreign text may be numbered according to the idea of the foregoing method. The character or foreign text is correspondingly converted into a number and then into binary data. In this way, a character string of 0s and 1s is also obtained.

For example, in quantization index modulation, the frequency domain coefficients are quantized into different value ranges according to the watermark data. For example, the value ranges are determined according to the value range step size. Because there are only 0s and 1s, the value range step size is used to divide the frequency domain coefficients into two value ranges. For example, the value range step size is 1000. "0-1000", "2000-3000", "4000-5000", . . . are used as one value range, and "1000-2000", "3000-4000", "5000-6000", . . . are used as one value range. 0 corresponds to one value range, and 1 corresponds to one value range.

Figure 7:
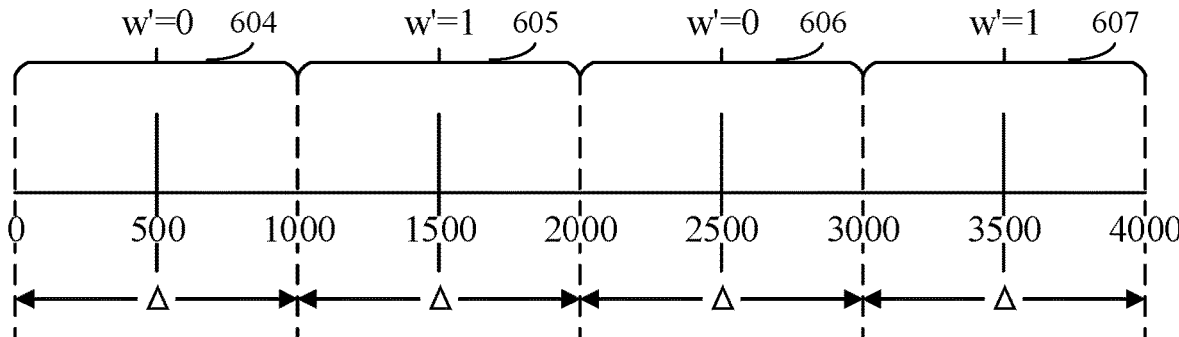
FIG. 7 is a schematic diagram of a value range of a method for embedding a watermark in video data according to another exemplary embodiment of this application.

For example, as shown in FIG. 7, a total value range of frequency domain coefficients is 0-4000. According to a value range step size A=1000, the total value range is divided into four value intervals: a first value interval 604: "0-1000"; a second value interval 605: "1000-2000"; a third value interval 606: "2000-3000"; and a fourth value interval 607: "3000-4000". The first value interval 604 and the third value interval 606 form the first value range, corresponding to 0; and the second value interval 605 and the fourth value interval 607 form the second value range, corresponding to 1.

Step 2031-2: Determine a value of the watermark data at an $i^{th}$ bit. If the value at the $i^{th}$ bit is 0, step 2031-3 is performed. If the value at the $i^{th}$ bit is 1, step 2031-4 is performed.

Step 2031-3: Change the frequency domain coefficient at the $i^{th}$ target position in the frequency domain data to a value in the first value range in response to the value of the watermark data at the $i^{th}$ bit being 0, i being a positive integer less than or equal to k.

For example, the computer device changes the frequency domain coefficient at the $i^{th}$ target position according to the value of the watermark data at the $i^{th}$ bit, to make the frequency domain coefficient at the $i^{th}$ position fall within the value range corresponding to the watermark data. If the value of the watermark data at the $i^{th}$ bit is 0, the frequency domain coefficient at the $i^{th}$ target position is controlled to fall within the first value range; and if the value of the watermark data at the $i^{th}$ bit is 1, the frequency domain coefficient at the $i^{th}$ target position is controlled to fall within the second value range.

The value range shown in FIG. 7 is used as an example. For example, the value of the watermark data at the first bit is 0, and the frequency domain coefficient of the frequency domain data at the first target position is 1200. 0 corresponds to the first value interval 604 and the third value interval 606. A distance between the frequency domain coefficient of 1200 and the first value interval 604 is 200, and a distance between the frequency domain coefficient of 1200 and the third value interval 606 is 800. Therefore, the frequency domain coefficient of 1200 is changed to any value within the first value interval 604, for example, changed to 1000.

For example, as shown in FIG. 8, a method for changing a frequency domain coefficient is given. Step 2031-3 further includes step 2031-31.

Step 2031-31: Change the frequency domain coefficient at the $i^{th}$ target position in the frequency domain data to a midpoint value of a first value interval closest to the frequency domain coefficient in response to the value of the watermark data at the $i^{th}$ bit being 0, i being a positive integer less than or equal to k.

For example, the first value range includes at least one first value interval, the second value range includes at least one second value interval, and interval lengths of the first value interval and the second value interval are equal to the value range step size.

For example, a distance between a frequency domain coefficient and a value interval may be a distance between the frequency domain coefficient and a target endpoint of the value interval, the target endpoint being an endpoint of the value interval closest to the frequency domain coefficient; or a distance between the frequency domain coefficient and a midpoint of the value interval.

For example, the value interval closest to the frequency domain coefficient may be that a distance between the target endpoint of the value interval and the frequency domain coefficient is minimal. In another example, the value interval closest to the frequency domain coefficient may be that a distance between the midpoint of the value interval and the frequency domain coefficient is minimal. For example, in this embodiment, the target endpoint of the value interval is used as a reference for determination and the value interval of the target endpoint closest to the frequency domain coefficient is used as a target interval to change the frequency domain coefficient to fall within the target interval.

The value range shown in FIG. 7 is used as an example. For example, the value of the watermark data at the first bit is 0, and the frequency domain coefficient of the frequency domain data at the first target position is 1200. 0 corresponds to the first value interval 604 and the third value interval 606. A distance between the frequency domain coefficient of 1200 and the first value interval 604 is 200, and a distance between the frequency domain coefficient of 1200 and the third value interval 606 is 800. Therefore, the frequency domain coefficient of 1200 is changed to a midpoint value 500 of the first value interval 604. In another example, the value of the watermark data at the first bit is 0, and the frequency domain coefficient of the frequency domain data at the first target position is 2000. 0 corresponds to the first value interval 604 and the third value interval 606. A distance between the frequency domain coefficient of 2000 and the first value interval 604 is 1000, and a distance between the frequency domain coefficient of 2000 and the third value interval 606 is 0. Therefore, the frequency domain coefficient of 1200 is changed to a midpoint value 2500 of the third value interval 606.

For example, the frequency domain coefficient at the $i^{th}$ target position in the frequency domain data may be changed to a target endpoint value of the first value interval closest to the frequency domain coefficient in response to the value of the watermark data at the $i^{th}$ bit being 0. For example, when the first value interval includes the target endpoint, the frequency domain coefficient at the $i^{th}$ target position in the frequency domain data is changed to the target endpoint value of the first value interval closest to the frequency domain coefficient; when the first value interval includes the target endpoint, the frequency domain coefficient at the $i^{th}$ target position in the frequency domain data is changed to a target value of the first value interval closest to the frequency domain coefficient. The target value is the target endpoint value plus 1 or the target endpoint value minus 1. For example, when the target endpoint is the left endpoint of the first value interval, the target value is the target endpoint value plus 1. When the target endpoint is the right endpoint of the first value interval, the target value is the target endpoint value minus 1.

Step 2031-4: Change the frequency domain coefficient at the $i^{th}$ target position in the frequency domain data to a value in the second value range in response to the value of the watermark data at the $i^{th}$ bit being 1.

Based on the principle the same as that in step 2031-3, when the value of the watermark data is 1, the frequency domain coefficient is correspondingly changed to a value within the second value range.

For example, as shown in FIG. 8, a method for changing a frequency domain coefficient is given. Step 2031-4 further includes step 2031-41.

Step 2031-41: Change the frequency domain coefficient at the $i^{th}$ target position in the frequency domain data to a midpoint value of a second value interval closest to the frequency domain coefficient in response to the value of the watermark data at the $i^{th}$ bit being 1.

Based on the principle the same as that in step 2031-41, when the value of the watermark data is 1, the frequency domain coefficient is correspondingly changed to a midpoint value within the second value range.

Step 2032: Repeat the foregoing operation to change frequency domain coefficients at k target positions in the frequency domain data to obtain the watermarked frequency domain data.

For example, according to the foregoing method for changing a frequency domain coefficient, the computer device correspondingly changes a frequency domain coefficient in frequency domain data according to watermark data at each bit to obtain watermarked frequency domain data embedded with a watermark.

In summary, in the method provided in this embodiment, k target positions are correspondingly specified in frequency domain data according to a data amount (bits) occupied by watermark data, and then frequency domain coefficients at the k target positions are changed according to the watermark data, to embed the watermark data in the frequency domain data. For example, the k target positions may be k pixels. That is, one piece of watermark data corresponds to one pixel (position). The frequency domain coefficients corresponding to the k pixels are correspondingly changed according to the watermark data, to embed the watermark data at the k pixels. For example, the target positions may be specified by specifying the position of the first pixel, and then the position of a pixel corresponding to a next piece of watermark data is determined according to a step size, so that the positions of the k pixels corresponding to the k bits of watermark data are determined. For example, if each target position includes a plurality of pixels, during the extraction of watermark data, watermark data at a bit corresponding to a target position may be determined according to majority watermark data in a plurality of pieces of watermark data extracted from the target position, thereby further improving the robustness of watermarks.

In the method provided in this embodiment, watermark data is converted into binary data, and then a value range of frequency domain coefficients is divided into a plurality of intervals. 0 corresponds to some intervals, and 1 corresponds to some intervals. If watermark data to be embedded at the target position is 0, the frequency domain coefficient at the target position is adjusted to fall within an interval corresponding to 0. If watermark data to be embedded at the target position is 1, the frequency domain coefficient at the target position is adjusted to fall within an interval corresponding to 1. In this way, watermark data corresponding to a frequency domain coefficient may be determined according to the value of the frequency domain coefficient, to embed watermark data in an image.

In the method provided in this embodiment, a value range of frequency domain coefficients is divided into a plurality of intervals by using a value range step size. One interval corresponds to one binary number (0 or 1), and then intervals corresponding 0 and 1 are alternately distributed. In this way, during the embedding of watermark data, watermark data (0 or 1) may be adjusted to fall within nearby corresponding intervals. For example, the value range step size is 1000. 0-1000, 2000-3000, and 4000-5000, . . . correspond to 0, and 1000-2000, 3000-4000, and 5000-6000, . . . correspond to 1.

For example, a data format of an original image frame extracted from video data is an RGB format. To further reduce the impact of watermark data on a picture of the video data, the original image frame is converted from the RGB format into a YCrCb format. Watermark data is embedded in data of a Cb channel in the format.

Figures 9, 10:
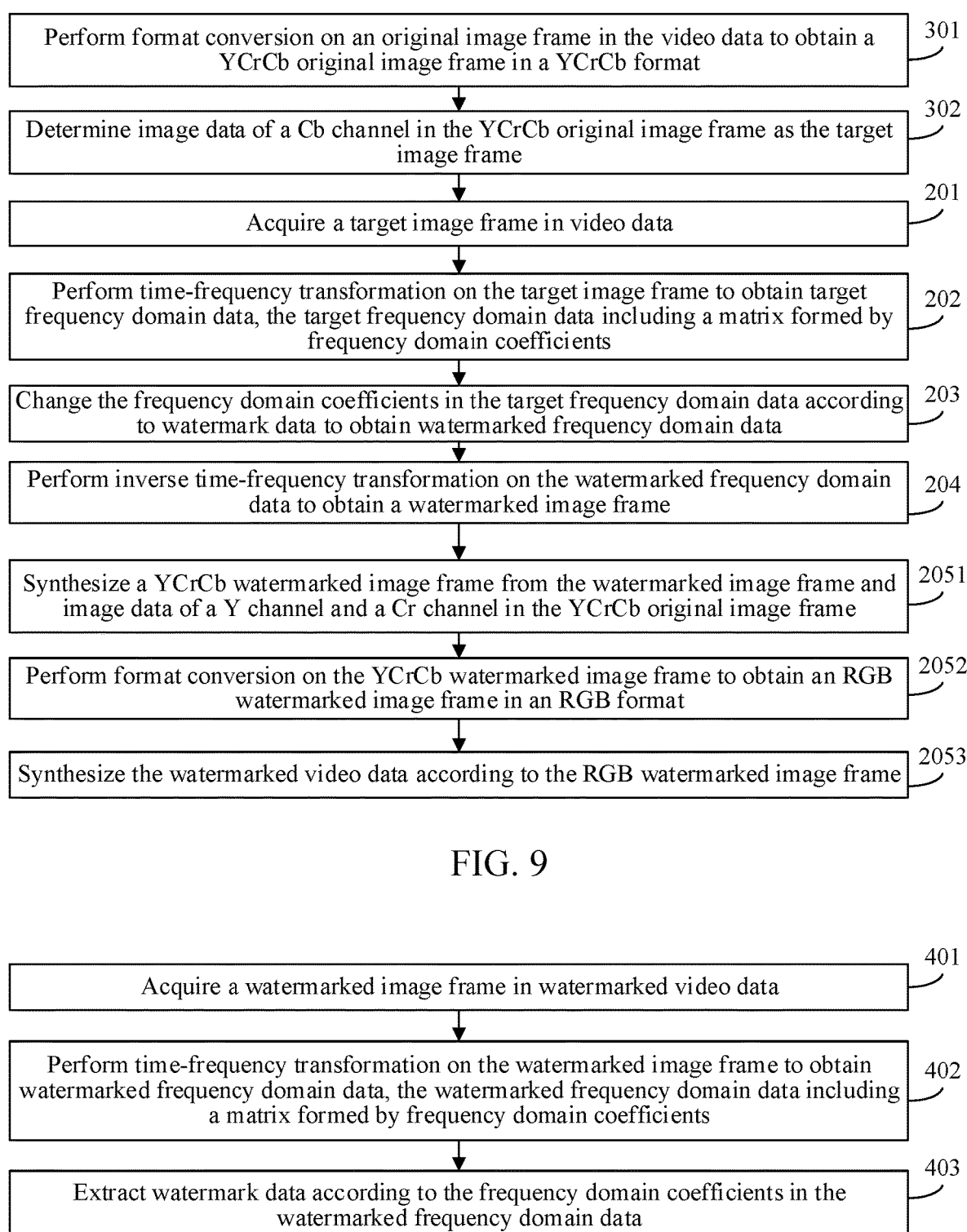
FIG. 9 is a flowchart of a method for embedding a watermark in video data according to another exemplary embodiment of this application.
FIG. 10 is a flowchart of a method for extracting a watermark in video data according to another exemplary embodiment of this application.

FIG. 9 is a flowchart of a method for embedding a watermark in video data according to an exemplary embodiment of this application. The server may be performed by a computer device, for example, performed by a client or server shown in FIG. 1. Based on the exemplary embodiment shown in FIG. 2, before step 201, the method further includes step 301 and step 302, and step 205 further includes step 2051 to step 2053.

Step 301: Perform format conversion on an original image frame in the video data to obtain a YCrCb original image frame in a YCrCb format.

For example, the computer device splits video data into frames to obtain an original image frame of the video data. For example, the original image frame of the video data is in an RGB format. That is, one pixel in an image corresponds to three values in an R channel, a G channel, and a B channel. The computer device further converts the RGB format into the YCrCb format to obtain a YCrCb original image frame. That is, one pixel in an image corresponds to three values in a Y channel, a Cb channel, and a Cr channel.

For example, the format conversion between the RGB format and the YCrCb format may be completed by using the following formulas:

$$Y=0.257*R+0.504*G+0.098*B+16;$$

$$Cb=-0.148*R-0.291*G+0.439*B+128; \text{ and}$$

$$Cr=0.439*R-0.368*G-0.071*B+128.$$

Step 302: Determine image data of a Cb channel in the YCrCb original image frame as the target image frame.

For example, a Cb channel reflects a difference between a blue part in an RGB image and a brightness value of the RGB image. Generally, changes in data of the Cb channel are not easily discernible to humans' eyes.

For example, the computer device further converts the data of the Cb channel from an integer type into a floating-point type, and then discrete cosine transform is performed on data (a target image frame) of the floating-point type Cb channel. That is, the target image frame is floating-point type data.

Step 2051: Synthesize a YCrCb watermarked image frame from the watermarked image frame and image data of a Y channel and a Cr channel in the YCrCb original image frame.

For example, after the computer device embeds the watermark data in the target image frame to obtain a watermarked image frame, the watermarked image frame is Cb channel data. Therefore, the computer device further synthesizes a complete image (a YCrCb watermarked image frame) by using the watermarked image frame and image data of the original Y channel and Cr channel.

For example, the image data of the Y channel in the YCrCb original image frame is the target image frame; or the image data of the Cr channel in the YCrCb original image frame is the target image frame.

For example, instead of performing step 301, the image data of the R channel in the original image frame (the RGB format) may be directly determined as the target image frame; or the image data of the G channel in the original image frame (the RGB format) may be directly determined as the target image frame; and the image data of the B channel in the original image frame (the RGB format) may be directly determined as the target image frame.

Step 2052: Perform format conversion on the YCrCb watermarked image frame to obtain an RGB watermarked image frame in an RGB format.

For example, the format conversion between the YCrCb format and the RGB format may be completed by using the following formulas:

$$R=1.164*(Y-16)+1.596*(Cr-128);$$

$$G=1.164*(Y-16)-0.813*(Cr-128)-0.392*(Cb-128); \text{ and}$$

$$B=1.164*(Y-16)+2.017*(Cb-128).$$

Step 2053: Synthesize the watermarked video data according to the RGB watermarked image frame.

For example, after the computer device converts a YCrCb watermarked image frame into an RGB format, watermarked video data is synthesized according to an RGB watermarked image frame in an RGB format.

In summary, in the method provided in this embodiment, an original image extracted from video data is converted from an RGB format into a YCrCb format. Image data of a Cb channel is extracted in the YCrCb format, to further reduce the overall impact of watermark data on an image, thereby improving the concealment of watermarks.

FIG. 10 is a flowchart of a method for extracting a watermark in video data according to an exemplary embodiment of this application. The server may be performed by a computer device, for example, performed by a client or server shown in FIG. 1. The method includes the following steps:

Step 401: Acquire a watermarked image frame in watermarked video data.

For example, if all image frames in the watermarked video data are embedded in watermark data, the watermarked image frame is all image frames of the watermarked video data.

For example, if watermark data is embedded in only some image frames in the watermarked video data, the computer device may select the watermarked image frames from the watermarked video data according to a method for selecting an image frame during embedding. For example, during embedding, one piece of watermark data is embedded at intervals of two frames of image, so that during extraction, one image of frame is extracted at intervals of two frames of image as a watermarked image frame. For example, if watermark data is embedded in a relatively large number of image frames, a watermark may be extracted from every frame of image according to a watermark extraction method, and then majority watermark data in extracted watermark data is determined as final watermark data.

Step 402: Perform time-frequency transformation on the watermarked image frame to obtain watermarked frequency domain data, the watermarked frequency domain data including a matrix formed by frequency domain coefficients.

For example, corresponding to the watermark embedding method, during watermark extraction, watermark data is still extracted from frequency domain data of the watermarked image frames. Therefore, time-frequency transformation is performed on the watermarked image frame to obtain watermarked frequency domain data. For example, the time-frequency transformation includes discrete cosine transform. For a formula of the discrete cosine transform, reference may be made to the formula provided above.

Step 403: Extract watermark data according to the frequency domain coefficients in the watermarked frequency domain data.

For example, watermark data is extracted from watermarked frequency domain data according to a method for changing a frequency domain coefficient in the watermark embedding method.

For example, as shown in FIG. 11, a method for extracting watermark data is given. Step 403 further includes step 4031 and step 4032.

Step 4031: Determine a value of the watermark data at an $i^{th}$ bit according to a frequency domain coefficient at an $i^{th}$ target position in the watermarked frequency domain data, the $i^{th}$ target position being a position in the matrix corresponding to the $i^{th}$ bit, i being a positive integer less than or equal to k.

For example, the watermark data occupies k bits, and k is a positive integer.

For example, according to the foregoing watermark embedding method, each bit of the watermark data corresponds to one target position in the watermarked frequency domain data. During watermark extraction, watermark data at the bit may be determined according to a value of a frequency domain coefficient at the target position in the watermarked frequency domain data.

Figure 12:
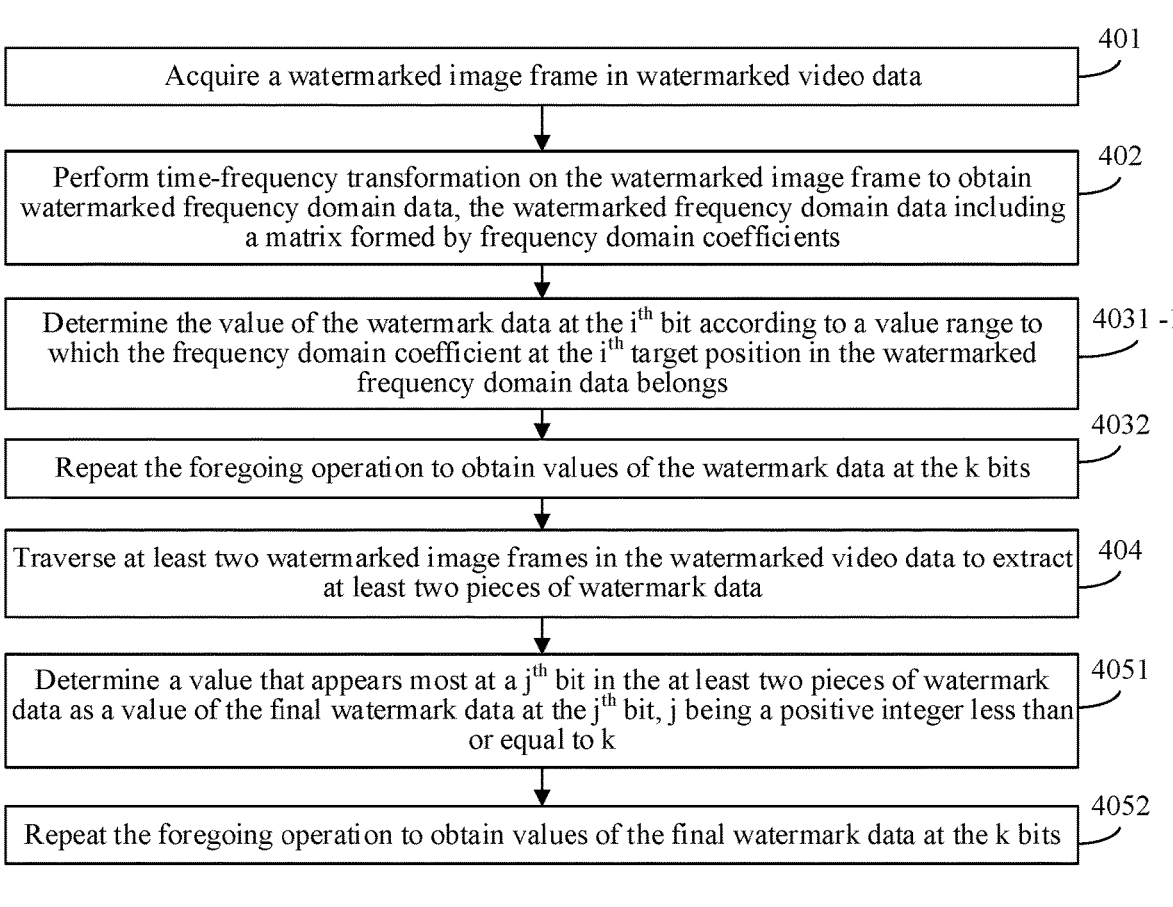
FIG. 12 is a flowchart of a method for extracting a watermark in video data according to another exemplary embodiment of this application.

For example, as shown in FIG. 12, a method for extracting watermark data is given. Step 4031 further includes step 4031-1.

Step 4031-1: Determine the value of the watermark data at the $i^{th}$ bit according to a value range to which the frequency domain coefficient at the $i^{th}$ target position in the watermarked frequency domain data belongs.

For example, the watermark data is binary data. The value range is determined according to a value range step size, the value range includes a first value range and a second value range, a value of the watermark data corresponding to the first value range is 0, and a value of the watermark data corresponding to the second value range is 1.

The value ranges shown in FIG. 7 are used as examples. For example, the frequency domain coefficient at the first target position is 800. The frequency domain coefficient at the first target position falls within the first value interval 604. The first value interval 604 corresponds to 0. The value of the watermark data of the first bit is 0.

Step 4032: Repeat the foregoing operation to obtain values of the watermark data at the k bits.

Therefore, the computer device may determine the value of the watermark data at each bit according to the frequency domain coefficient at a corresponding target position of each bit of the watermark data in the frequency domain data.

For example, if the watermark data is converted into binary data from an English text, the initial English text may be obtained through inversion according to the obtained binary watermark data.

For example, during the embedding of watermark data, embedding is performed at data in a Cb channel. Therefore, during the extraction of watermark data, extraction is performed on the data in the Cb channel. As shown in FIG. 11, before step 401, the method further includes step 501 and step 502.

Step 501: Perform format conversion on an RGB watermarked image frame in the watermarked video data to obtain a YCrCb watermarked image frame in a YCrCb format.

For example, the computer device extracts an RGB watermarked image frame embedded in the watermark data from the watermarked video data, and then converts the RGB watermarked image frame into a YCrCb watermarked image frame in the YCrCb format.

Step 502: Determine image data of a Cb channel in the YCrCb watermarked image frame as the watermarked image frame.

The computer device performs discrete cosine transform on image data in the Cb channel. For example, the computer device further converts the data of the Cb channel from an integer type into a floating-point type, and then discrete cosine transform is performed on data of the floating-point type Cb channel. That is, the watermarked image frame is floating-point type data.

For example, watermark data is embedded in at least two frames of image in the watermarked video data. Therefore, as shown in FIG. 11, after step 403, the method further includes step 404 and step 405.

Step 404: Traverse at least two watermarked image frames in the watermarked video data to extract at least two pieces of watermark data.

The watermarked video data includes a plurality of watermarked image frames. Therefore, the computer device may obtain a plurality of pieces of watermark data by traversing all watermarked image frames.

Step 405: Determine final watermark data according to the at least two pieces of watermark data based on a majority principle.

For example, for the plurality of pieces of obtained watermark data, according to a plurality of values at each bit, one value that appears most may be elected from the plurality of values based on a majority principle as final watermark data at the bit.

For example, for the plurality of pieces of obtained watermark data, watermark data that appears most may be used as final watermark data based on a majority principle. For example, the plurality of pieces of obtained watermark data are "0100", "0101", "0111", "0100", and "0100". 0100 appears three times. The final watermark data is "0100".

For example, a method for extracting final watermark data is extracted based on a majority principle. As shown in FIG. 12, Step 405 further includes step 4051 and step 4052.

Step 4051: Determine a value that appears most at a $j^{th}$ bit in the at least two pieces of watermark data as a value of the final watermark data at the $j^{th}$ bit, j being a positive integer less than or equal to k.

For example, the watermark data occupies k bits, and k is a positive integer.

For example, the majority principle is that for one group of data, a maximum value that occupies the largest ratio in the group of data is elected as final data. For example, the plurality of pieces of obtained watermark data are "0100", "0101", "0111", "0100", and "0100". Values at the first bit are respectively 0, 0, 0, 0, and 0. The value of the final watermark data at the first bit is 0. Values at the second bit are respectively 1, 1, 1, 1, and 1. The value of the final watermark data at the second bit is 1. Values at the third bit are respectively 0, 0, 1, 0, and 0. The value of the final watermark data at the third bit is 0. Values at the fourth bit are respectively 0, 1, 1, 0, and 0. The value of the final watermark data at the fourth bit is 0. The obtained final watermark data is "0100".

Step 4052: Repeat the foregoing operation to obtain values of the final watermark data at the k bits.

For example, according to the foregoing method, the computer device may sequentially determine the values of the final watermark data at the k bits.

In summary, in the method provided in this embodiment, during the extraction of watermark data, time-frequency transformation is performed on watermarked image data in video data to obtain frequency domain data, and then verification watermark data is extracted from the frequency domain data. Because one piece of video data includes a plurality of frames of watermarked image data, a plurality of pieces of verification watermark data may be extracted. According to a majority principle, a value that appears most in data at each bit in the verification watermark data is determined as a value of the watermark data at the bit, and then the watermark data is obtained, thereby improving the robustness of watermarks.

For example, the embodiments of this application further provide a method for extracting watermark data from a watermarked video by using a neural network.

Figure 13:
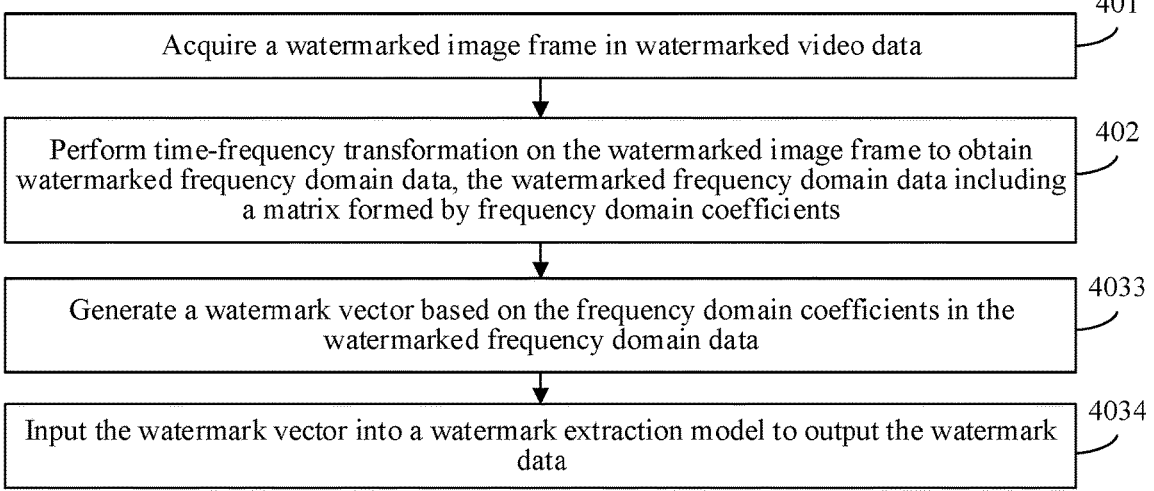
FIG. 13 is a flowchart of a method for extracting a watermark in video data according to another exemplary embodiment of this application.

FIG. 13 is a flowchart of a method for extracting a watermark in video data according to an exemplary embodiment of this application. The server may be performed by a computer device, for example, performed by a client or server shown in FIG. 1. Based on the exemplary embodiment shown in FIG. 10, step 403 further includes step 4033 and step 4034.

Step 4033: Generate a watermark vector based on the frequency domain coefficients in the watermarked frequency domain data.

For example, a watermark vector at the $i^{th}$ target position is generated based on scramble information and watermark information at the $i^{th}$ target position in the watermarked frequency domain data. For a method of generating a watermark vector, reference may be made to a method of generating a scrambled watermark vector below.

Step 4034: Input the watermark vector into a watermark extraction model to output the watermark data.

For example, the watermark extraction model is configured to output the watermark data based on the inputted vector.

A method of training the watermark extraction model may be: scrambling the watermarked video data to obtain scrambled watermarked video data; acquiring a scrambled watermarked image frame in the scrambled watermarked video data; performing time-frequency transformation on the scrambled watermarked image frame to obtain scrambled frequency domain data, the scrambled frequency domain data including a matrix formed by scrambled frequency domain coefficients; generating a scrambled watermark vector based on the scrambled frequency domain data; inputting the scrambled watermark vector into a watermark extraction model to output scrambled watermark data; calculating a loss value between the watermark data and the scrambled watermark data by using the watermark data as an actual value; and training the watermark extraction model based on the loss value.

In one embodiment, a sample set is first acquired. The sample set may include an unscrambled watermarked video and scrambled watermarked video. Time-frequency transformation is performed on a video in the sample set to obtain frequency domain data. A watermark vector is generated based on the obtained frequency domain data. The watermark vector is inputted into the watermark extraction model to output predicted watermark data. A loss value between the predicted watermark data and actual watermark data is calculated. The watermark extraction model is trained according to the loss value.

A method of generating a scrambled watermark vector based on the scrambled frequency domain data is: generating a scrambled watermark vector at the $i^{th}$ target position based on scramble information and watermark information at the $i^{th}$ target position in the scrambled frequency domain data; and repeating the foregoing operation to generate k scrambled watermark vectors at the k target positions, where the watermark information includes: a scrambled frequency domain coefficient at the $i^{th}$ target position in the scrambled frequency domain data, scrambled frequency domain coefficients at n target positions around the $i^{th}$ target position, at least one of step sizes of the $i^{th}$ target position and an $(i+1)^{th}$ target position, n being a positive integer, i being a positive integer less than or equal to k.

During watermark embedding, k bits of watermark data are correspondingly embedded at k target positions of frequency domain data. Therefore, during watermark extraction, the k bits of watermark data are respectively extracted from the k target positions. Because the video is scrambled, the frequency domain data may have some changes, and as a result the accuracy of extracted watermark data is further affected. Therefore, this embodiment provides a method for extracting watermark data by using a watermark extraction model. For a scrambled video, correct watermark data embedded at a target position may be predicted based on a series of data such as a scramble method, interference related information, a frequency domain coefficient of a target position, a frequency domain coefficient at a position near the target position, and a step size (an interval between two adjacent target positions) during embedding of watermark data in frequency domain data. Relatively accurate watermark data is then extracted from the video.

For example, the scrambled watermark vector at the $i^{th}$ target position is inputted into the watermark extraction model to output a value of the scrambled watermark data at the $i^{th}$ bit; and the foregoing steps are repeated to obtain the k values of the k bits of the scrambled watermark data.

For example, the watermarked video data is scrambled to obtain the scrambled watermarked video data, the scrambling including at least one of compression, offsetting, or cropping, where the scramble information includes at least one of compression information, offsetting information, or cropping information, the compression information includes at least one of a compression ratio or a compression mode, the offsetting information includes at least one of an offset amount or an offset position, and the cropping information includes at least one of a cropping position or a cropping size.

For example, the watermarked video data is compressed to obtain compressed watermarked video data. A compressed watermarked image frame in compressed watermarked video data is acquired. Time-frequency transformation is performed on the compressed watermarked image frame to obtain compressed frequency domain data, the compressed frequency domain data including a matrix formed by compressed frequency domain coefficients. A compressed watermark vector is generated based on information such as a compressed frequency domain coefficient at the $i^{th}$ target position in the compressed frequency domain data, a compressed frequency domain system of 4*4 pixels around the $i^{th}$ target position, a step size between two adjacent target positions, and a compression ratio. The compressed watermark vector is used as an input of the watermark extraction model. Actual watermark data at the $i^{th}$ target position is used as an actual label. The trained watermark extraction model outputs watermark data at the $i^{th}$ target position. The watermark extraction model of the watermark data can be accurately outputted based on the inputted watermark vector, and a watermark is extracted by using the watermark extraction model.

For example, the watermark extraction model may be formed by an input layer, a hidden layer, and an output layer.

In summary, in the method provided in this embodiment, a watermark extraction model is used to perform watermark extraction on a video that requires watermark extraction. After a video is compressed, offset, cropped or scrambled in another method, based on frequency domain data of the scrambled video, a watermark vector at each target position in the frequency domain data is generated, and each watermark vector is respectively inputted into the watermark extraction model, and the watermark extraction model is enabled to predict watermark data at the target position, so that when the video is scrambled, the accuracy of extracted watermark data is ensured, thereby improving the robustness of watermarks.

Figure 14:
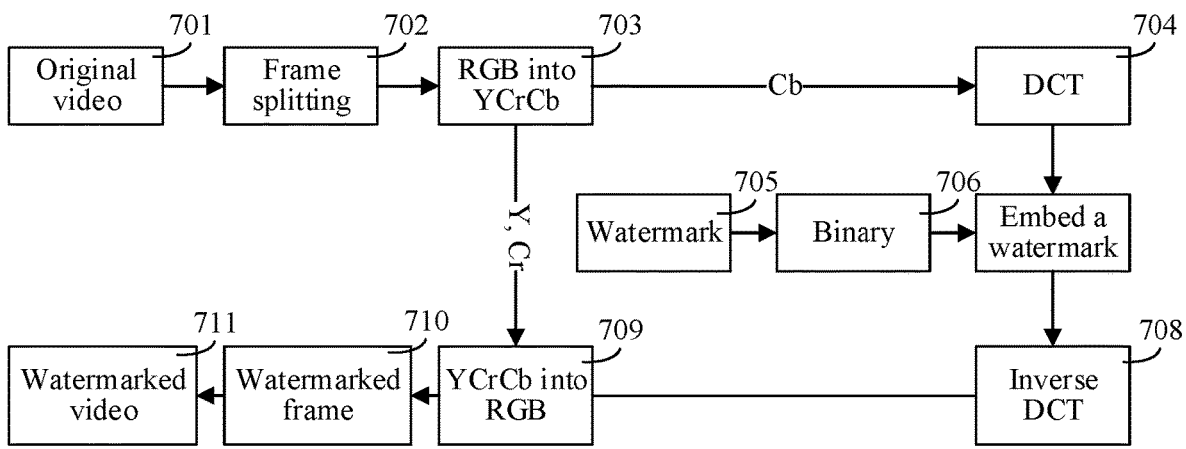
FIG. 14 is a flowchart of a method for embedding a watermark in video data according to another exemplary embodiment of this application.

For example, FIG. 14 is a flowchart of a method for embedding a watermark in video data is given. The server may be performed by a computer device, for example, performed by a client or server shown in FIG. 1. The method includes the following steps:

First, frame splitting 702 is performed on an original video 701 to obtain an original image frame, and then format conversion 703 is performed on the original image frame: the original image frame is converted from an RGB format into a YCrCb format, to obtain a YCrCb original image frame, and image data in a Cb channel is extracted from the YCrCb original image frame as the target image frame. Next, DCT processing 704 is performed on the target image frame to obtain the target frequency domain data of the target image frame. For a watermark 705, binary conversion 706 is first performed to obtain a binary character string of a watermark. Next, the binary character string of the watermark is embedded in the target frequency domain data to obtain the watermarked frequency domain data. Inverse DCT processing 708 is performed on the watermarked frequency domain data to obtain a watermarked image frame, and inverse format conversion 709 is performed on the watermarked image frame: the watermarked image frame is converted from a YCrCb format into an RGB format, to obtain an RGB watermarked image frame 710. Next, the watermarked video 711 is synthesized according to the RGB watermarked image frame 710.

Figure 15:
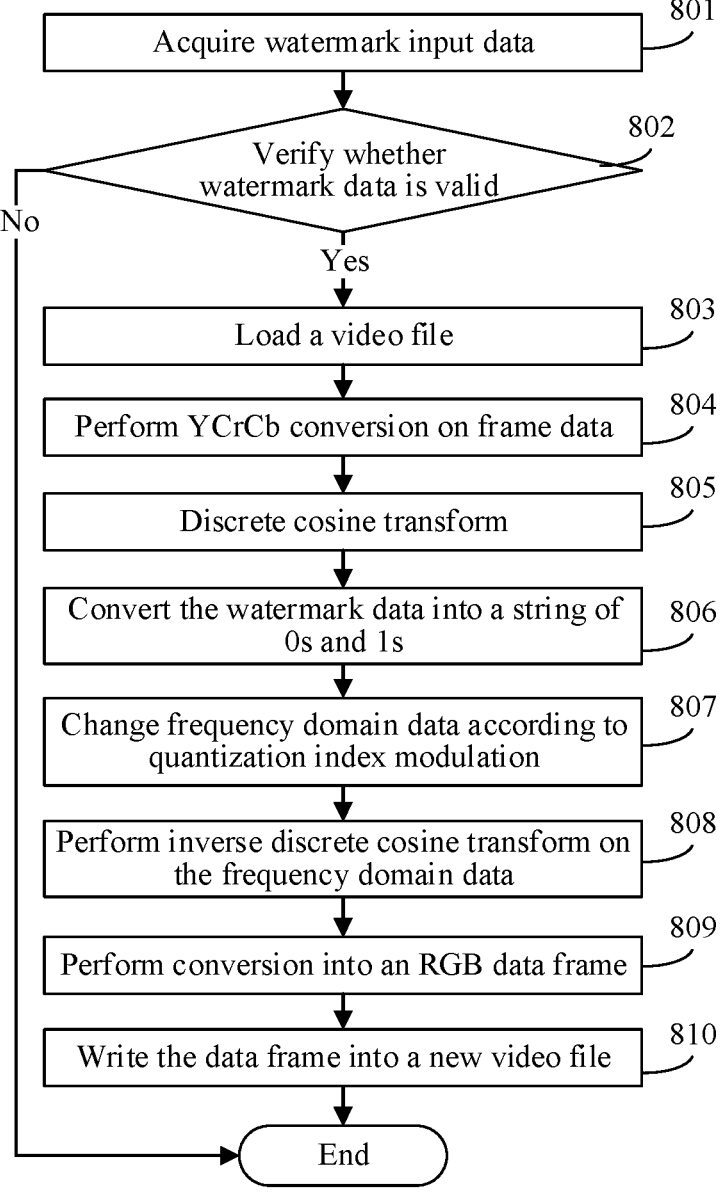
FIG. 15 is a flowchart of a method for embedding a watermark in video data according to another exemplary embodiment of this application.

For example, FIG. 15 is a flowchart of another method for embedding a watermark in video data is given. The server may be performed by a computer device, for example, performed by a client or server shown in FIG. 1. The method includes the following steps:

Step 801: The computer device acquires watermark input data. For example, the computer device receives inputted watermark data.

Step 802: The computer device verifies whether watermark data is valid. For example, it is verified whether the watermark data includes a sensitive word or whether the watermark data exceeds a maximum quantity of characters or whether the watermark data includes a forbidden character.

Step 803: If the watermark data is valid, the computer device loads a video file (video data). If the watermark data is invalid, the process ends. For example, if the watermark data is invalid, the computer device may display corresponding prompt information to prompt a user to reenter watermark data.

Step 804: The computer device converts an image frame of the video data from an RGB format into a YCrCb format.

Step 805: The computer device performs discrete cosine transform on image data in a Cb channel in the image frame in the YCrCb format to obtain target frequency domain data.

Step 806: The computer device converts the watermark data into binary data to obtain a string of 0s and 1s (a binary character string).

Step 807: The computer device changes the target frequency domain data according to quantization index modulation to obtain watermarked frequency domain data.

Step 808: The computer device performs inverse discrete cosine transform on the watermarked frequency domain data to obtain a watermarked image frame.

Step 809: The computer device converts the watermarked image frame from a YCrCb format into an RGB format to obtain an RGB watermarked image frame.

Step 810: The computer device writes the RGB watermarked image frame into a new video file to synthesize watermarked video data.

Figure 16:
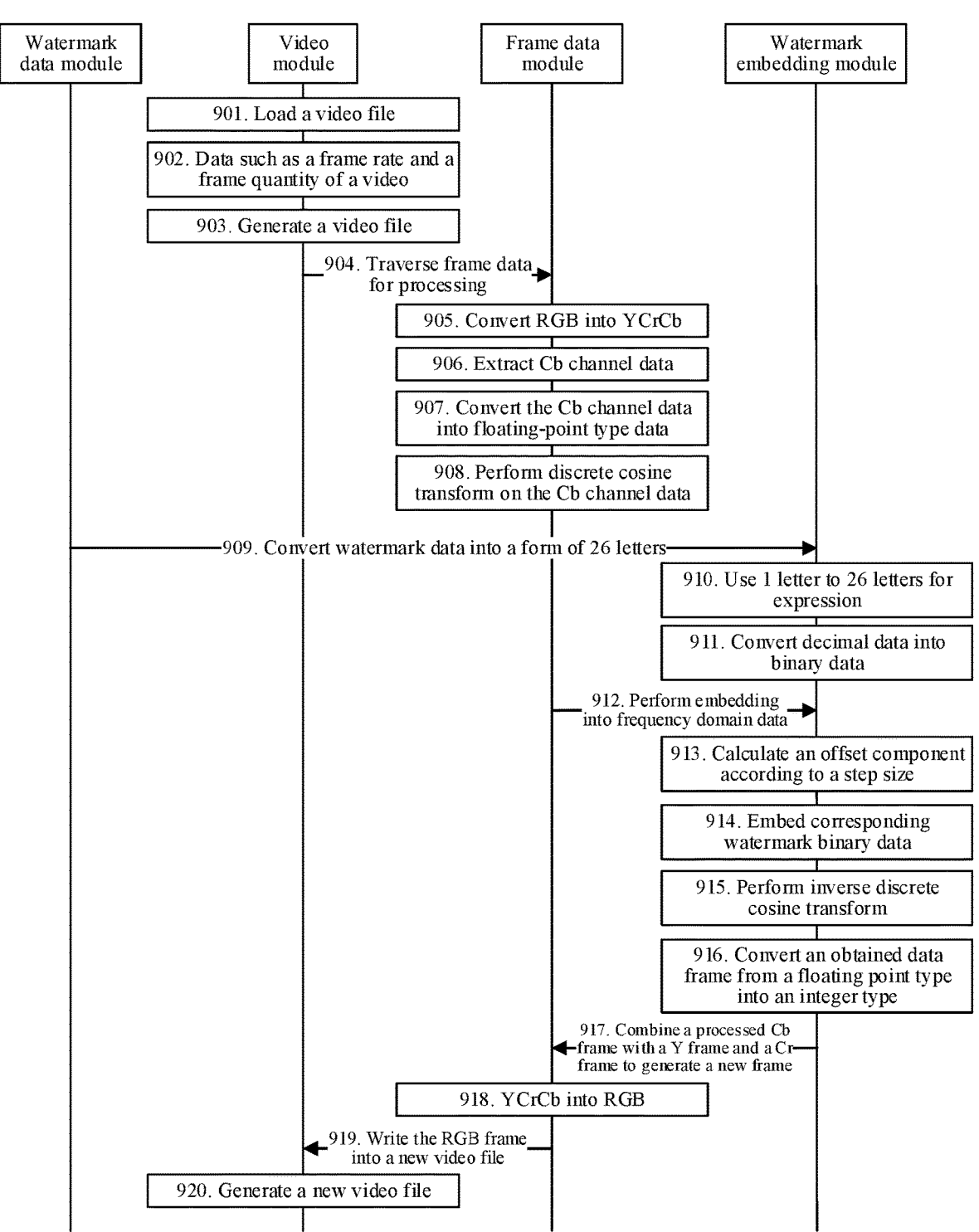
FIG. 16 is a flowchart of a method for embedding a watermark in video data according to another exemplary embodiment of this application.

For example, FIG. 16 is a timing chart of another method for embedding a watermark in video data is given. The server may be performed by a computer device, for example, performed by a client or server shown in FIG. 1. The method includes the following steps:

For example, the computer device includes a watermark data module, a video module, a frame data module, and a watermark embedding module. For example, in this embodiment, the module division method is only used as an example to describe the foregoing method for embedding a watermark in video data. In some embodiments, more or fewer modules may be used to implement the foregoing method for embedding a watermark in video data.

Step 901: The video module loads a video file by using Opencv and reads video parameter data.

For example, in this embodiment, the method for embedding a watermark in video data is implemented by using Opencv. Opencv is a cross-platform computer vision and machine learning software library released based on Berkeley Software Distribution (BSD) License (Open-source) and may run operating systems such as Linux, Windows, Android, and Mac OS. Opencv is lightweight and efficient and is formed by a series of C functions and a small number of C++ classes. Opencv provides interfaces of languages such as Python, Ruby, and MATLAB, and implements many universal algorithms in the aspects of image processing and computer vision.

Step 902: The video module stores a frame rate, a frame quantity, an encoding format, a width, and a height of a video.

Step 903: The video module generates a new video file (video data) by using the same parameters.

Step 904: The frame data module traverses all frames (target image frames) of data in the video for processing.

Step 905: After obtaining current frame data in an RGB format by default, the frame data module first converts the frame data from the RGB format into a YCrCb format to obtain a YCrCb data frame.

Step 906: The frame data module extracts blue channel data Cb in the YCrCb data frame.

Step 907: The frame data module converts the blue channel data Cb from an integer type into a floating-point type for expression.

Step 908: The frame data module performs discrete cosine transform on a frame of the blue channel data Cb to obtain spectrum domain data in a Cb component.

Step 909: The watermark embedding module reads watermark data from the watermark data module, examines the embedded watermark data, and generally convert the watermark data into 26 uppercase English letters.

For example, the watermark data is stored in the watermark data module. When a watermark needs to be embedded in a video file, the watermark embedding module acquires watermark data from the watermark data module and examines the validity of the watermark data. For example, it is examined whether there is an invalid character in the watermark data, whether there is a sensitive word in the watermark data, or the like.

If the watermark data is valid, when the watermark data is a Chinese character, the watermark data is converted into 26 English letters to facilitate conversion of an English letter into a number in subsequent steps, thereby obtaining binary watermark data.

Step 910: The watermark embedding module uses 1 to 26 to respectively represent the letters for expression to obtain digital watermark data.

For example, the numbers 1 to 26 respectively correspond to 26 English letters. The watermark embedding module converts the watermark data in English letters obtained in step 909 into decimal numbers.

For example, the watermark data is "TENCENT". 1 to 26 are used to represent the watermark data to obtain seven decimal numbers: 20, 5, 14, 3, 5, 14, and 20.

Step 911: The watermark embedding module converts the decimal digital watermark data into a binary string of 0s and 1s (a binary character string).

For example, the seven decimal numbers 20, 5, 14, 3, 5, 14, and 20 obtained in the foregoing step are converted into binary numbers to obtain a string of 0s and 1s: 10100 00101 1110 00011 00101 01110 10100.

Step 912: The watermark embedding module reads the spectrum domain data from the frame data module, and embeds watermark data in the spectrum domain data.

For example, the watermark embedding module determines a corresponding target position of each bit of the watermark data in the spectrum domain data, and changes the frequency domain coefficient at the target position according to the value of the watermark data at the bit.

For example, the string of 0s and 1s of the watermark data is 0011. The watermark data has four bits. Each bit has one character. For example, a position (4, 4) of spectrum domain data is used as a target position corresponding to the first bit, and a step size of 3 is used to determine a target position corresponding to a next bit. The first character 0 of the watermark data is embedded at the position of spectrum domain data matrix coordinates (4, 4), the second character 0 of the watermark data is embedded at the position of spectrum domain data matrix coordinates (7, 4), the third character 1 of the watermark data is embedded at the position of spectrum domain data matrix coordinates (10, 4), and the fourth character 1 of the watermark data is embedded at the position of spectrum domain data matrix coordinates (13, 4).

Step 913: The watermark embedding module calculates the target position corresponding to the watermark data at each bit according to the step size and the start position (4, 4).

Step 914: The watermark embedding module embeds values 0 and 1 of the watermark data at different target positions.

For example, the watermark embedding module adjusts the frequency domain coefficient at the target position to fall within a value range corresponding to the watermark data, to embed the watermark data.

For example, a value range corresponding to watermark data 0 is 0-1000, and a value range corresponding to watermark data 1 is 1000-2000. If the watermark data 0 needs to be embedded at the position (4, 4) of the spectrum domain data, the frequency domain coefficient at the position needs to be adjusted to fall within the range 0-1000. It is assumed that the original frequency domain coefficient at the position (4, 4) is 1200, the frequency domain coefficient is changed to 500 to embed the watermark data 0 at the position (4, 4). Correspondingly, during the extraction of watermark data, according to the frequency domain coefficient 500 at the position (4, 4), it may be known that 500 is within the value range 1-1000 corresponding to 0. The watermark data embedded at the position is 0.

Step 915: The watermark embedding module performs inverse discrete cosine transform on the spectrum domain data frame embedded with the watermark data to obtain a watermarked data frame.

After the watermark data is embedded in the spectrum domain data, the spectrum domain data changed according to the watermark data is obtained, and then inverse discrete cosine transform is performed according to the changed spectrum domain data to obtain spatial domain data again (pixel value data), so that a watermarked image may be synthesized again according to the spatial domain data (the image data in the Cb channel) and data in other channels.

Step 916: The watermark embedding module converts the watermarked data frame obtained through inverse discrete cosine transform from a floating-point type into an integer type to obtain an integer-type watermarked data frame.

Step 917: The frame data module combines the integer-type watermarked data frame with the Y channel and the Cr channel of the original data frame to generate a new data frame (YCrCb data frame).

Step 918: The frame data module converts the YCrCb data frame into an RGB data frame.

Step 919: The frame data module writes a new data frame (the RGB data frame) in a new video file.

Next, a process of step 904 to step 919 is repeated until all data frames in the video file have been processed.

Step 920: The video module generates a new video file including the watermark data.

For example, the method for embedding a watermark in video data provided in any foregoing embodiment may be used to embed a watermark in an image file, that is, embed watermark data in a single frame of picture to obtain a watermarked picture.

Figure 17:
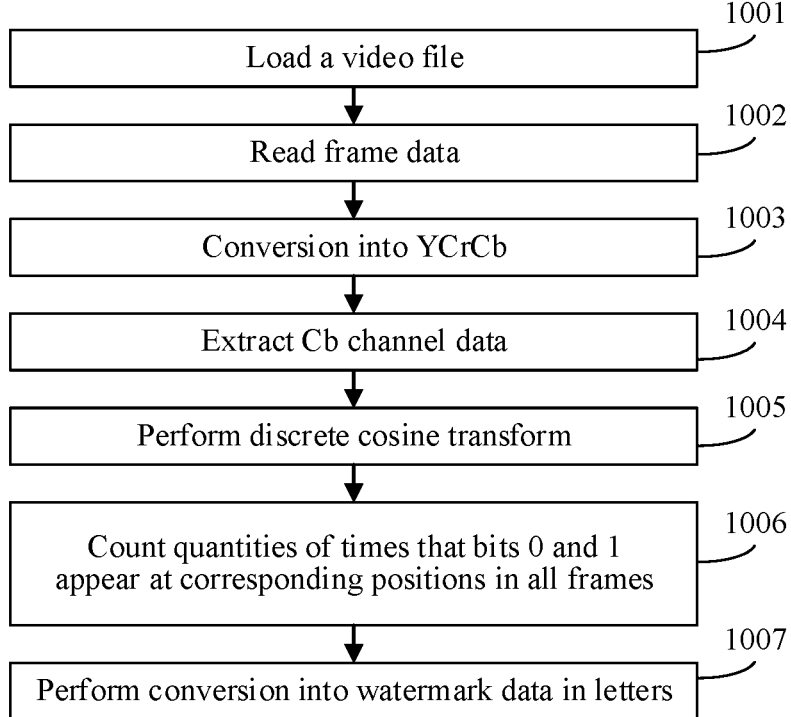
FIG. 17 is a flowchart of a method for extracting a watermark in video data according to another exemplary embodiment of this application.

For example, FIG. 17 is a flowchart of a method for extracting a watermark in video data is given. The server may be performed by a computer device, for example, performed by a client or server shown in FIG. 1. The method includes the following steps:

Step 1001: The computer device loads a video file (watermarked video data).

Step 1002: The computer device reads frame data (an RGB watermarked image frame) of the video file.

Step 1003: The computer device converts the frame data into a YCrCb format to obtain a YCrCb watermarked image frame.

Step 1004: The computer device extracts Cb channel data from the YCrCb watermarked image frame as a watermarked image frame.

Step 1005: The computer device performs discrete cosine transform on the watermarked image frame to obtain watermarked frequency domain data, and extracts watermark data from a target position corresponding to the watermark data at each bit.

Step 1006: The computer device collects statistics of a plurality of pieces of watermark data extracted from a plurality of watermarked image frames, and determines final watermark data according to a quantity of times that 0 and 1 appear at each bit.

Step 1007: The computer device converts the final watermark data into watermark data in letters.

For example, FIG. 18 is a flowchart of another method for extracting a watermark in video data is given. The server may be performed by a computer device, for example, performed by a client or server shown in FIG. 1. The method includes the following steps:

For example, the computer device includes a video module, a frame data module, and a watermark extraction module. For example, in this embodiment, the module division method is only used as an example to describe the foregoing method for extracting a watermark in video data. In some embodiments, more or fewer modules may be used to implement the foregoing method for extracting a watermark in video data.

Step 1101: The video module loads a video file by using Opencv and reads frame data (an RGB watermarked image frame) by frames.

Step 1102: The frame data module acquires current frame data.

For example, the frame data module acquires frame data of each frame in the video file, and extracts watermark data from the frame data of each frame.

Step 1103: Convert the frame data from an RGB format into a YCrCb format.

For example, the current frame data acquired in step 1102 is in an RGB format by default.

For example, the frame data module processes all frame data of the video file frame by frame starting from the first frame of data.

Step 1104: The frame data module extracts blue channel data Cb in the YCrCb data frame.

Step 1105: The frame data module converts the blue channel data Cb from an integer type into a floating-point type for expression.

Step 1106: The frame data module performs discrete cosine transform on the blue channel data Cb to obtain spectrum domain data in a Cb component.

Step 1107: The watermark extraction module calculates a value of the watermark data at each bit through quantization index modulation according to a corresponding position during the embedding of the watermark data.

The idea of a quantization index modulation algorithm is that target frequency domain data (a frequency domain coefficient) is quantized by a quantizer into different index intervals (value ranges) according to the watermark data. During watermark extraction, the watermark data is then recognized according to an index interval to which the watermarked frequency domain data (frequency domain coefficient) belongs.

For example, based on the target position during the embedding of the watermark data, the watermark extraction module determines a value of the watermark data corresponding to the target position according to a frequency domain coefficient of the spectrum domain data at the target position, to further extract the watermark data.

Step 1108: The watermark extraction module calculates each piece of frame data, and extract watermark data of all frame data.

Step 1109: The watermark extraction module collects data at each bit, and separately counts quantities of times that 0 and 1 appear.

For example, the watermark extraction module extracts a total of three pieces of watermark data, which are respectively: 01, 10, and 11. The watermark data has a total of two bits. For the first bit, the value of the first bit is collected from the three pieces of watermark data, which are respectively 0, 1, and 1. 0 appears once, and 1 appears twice. The value of the second bit is collected from the three pieces of watermark data, which are respectively 1, 0, and 1. 0 appears once, and 1 appears twice.

Step 1110: The watermark extraction module selects whether 0 or 1 appears most at each position through selection, and generates a final string of 0s and 1s.

For example, according to the distance of step 1108, 1 appears most at the first bit, and the value of the watermark data at the first bit is 1; and at the second bit, 1 appears most, and the value of the watermark data at the second bit is 1. Therefore, it may be obtained that the final watermark data is 11.

Step 1111: The watermark extraction module parses the string of 0s and 1s to obtain watermark data in letters.

The watermark data extracted from step 1109 is binary data. The watermark extraction module may restore the binary data into English letters.

For example, the binary watermark data is "10100 00101 01110 00011 00101 01110 10100". Every five pieces of binary data represents one piece of decimal data. After the binary watermark data is converted into decimal data, "20, 5, 14, 3, 5, 14, 20" may be obtained. Next, according to a correspondence relationship between numbers 1 to 26 and 26 letters, an English word "TENCENT" may be obtained. In this way, the initial watermark data "TENCENT" may be obtained.

The following is an apparatus embodiment of this application. For details not described in detail in the apparatus embodiment, reference may be made to corresponding record in the foregoing method embodiments. Details are not described herein again.

Figure 19:
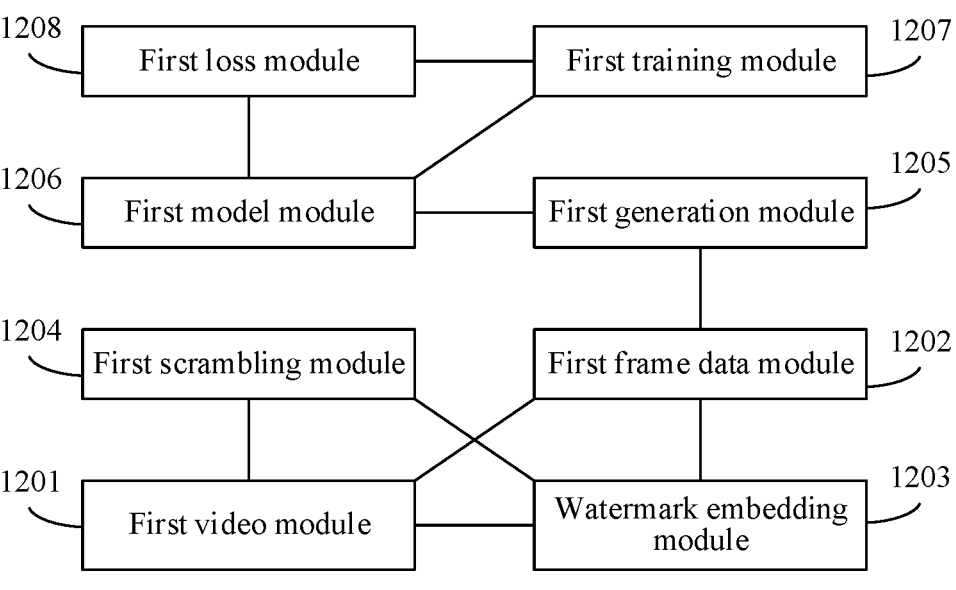
FIG. 19 is a block diagram of a video watermark embedding apparatus according to another exemplary embodiment of this application.

FIG. 19 is a schematic structural diagram of a video watermark embedding apparatus according to an exemplary embodiment of this application. The apparatus may be implemented as an entire computer device or a part of the computer device by using software, hardware, or a combination thereof. The apparatus includes:

a first video module 1201, configured to acquire a target image frame in video data;

a first frame data module 1202, configured to perform time-frequency transformation on the target image frame to obtain target frequency domain data, the target frequency domain data including a matrix formed by frequency domain coefficients; and a watermark embedding module 1203, configured to change the frequency domain coefficients in the target frequency domain data according to watermark data to obtain watermarked frequency domain data, the watermark embedding module 1203 being further configured to perform inverse time-frequency transformation on the watermarked frequency domain data to obtain a watermarked image frame, the first video module 1201 being further configured to synthesize watermarked video data according to the watermarked image frame.

In one embodiment, the watermark data occupies k bits, and k is a positive integer;

the watermark embedding module 1203 is further configured to change a frequency domain coefficient at an $i^{th}$ target position in the frequency domain data according to a value of the watermark data at an $i^{th}$ bit, the $i^{th}$ target position being a position in the matrix corresponding to the $i^{th}$ bit, i being a positive integer less than or equal to k; and the watermark embedding module 1203 is further configured to repeat the foregoing operation to change frequency domain coefficients at k target positions in the frequency domain data to obtain the watermarked frequency domain data.

In one embodiment, the watermark data is binary data;

the watermark embedding module 1203 is further configured to determine a first value range of frequency domain coefficients corresponding to 0 in the binary data and a second value range of frequency domain coefficients corresponding to 1 in the binary data according to a value range step size; and the watermark embedding module 1203 is further configured to change the frequency domain coefficient at the $i^{th}$ target position in the frequency domain data to a value in the first value range in response to the value of the watermark data at the $i^{th}$ bit being 0, i being a positive integer less than or equal to k; or the watermark embedding module 1203 is further configured to change the frequency domain coefficient at the $i^{th}$ target position in the frequency domain data to a value in the second value range in response to the value of the watermark data at the $i^{th}$ bit being 1.

In one embodiment, the first value range includes at least one first value interval, the second value range includes at least one second value interval, and interval lengths of the first value interval and the second value interval are equal to the value range step size;

the watermark embedding module 1203 is further configured to change the frequency domain coefficient at the $i^{th}$ target position in the frequency domain data to a midpoint value of a first value interval closest to the frequency domain coefficient in response to the value of the watermark data at the $i^{th}$ bit being 0, i being a positive integer less than or equal to k; and the watermark embedding module 1203 is further configured to change the frequency domain coefficient at the $i^{th}$ target position in the frequency domain data to a midpoint value of a second value interval closest to the frequency domain coefficient in response to the value of the watermark data at the $i^{th}$ bit being 1.

In one embodiment, the first frame data module 1202 is further configured to perform format conversion on an original image frame in the video data to obtain a YCrCb original image frame in a YCrCb format; and the first frame data module 1202 is further configured to determine image data of a Cb channel in the YCrCb original image frame as the target image frame.

In one embodiment, the original image frame is image data in an RGB format;

the first frame data module 1202 is further configured to synthesize a YCrCb watermarked image frame from the watermarked image frame and image data of a Y channel and a Cr channel in the YCrCb original image frame;

the first frame data module is further configured to perform format conversion on the YCrCb watermarked image frame to obtain an RGB watermarked image frame in an RGB format; and the first video module 1201 is further configured to synthesize the watermarked video data according to the RGB watermarked image frame.

In one embodiment, the apparatus further includes:

a first scrambling module 1204, configured to scramble the watermarked video data to obtain scrambled watermarked video data;

the first video module 1201 being configured to acquire a scrambled watermarked image frame in the scrambled watermarked video data;

the first frame data module 1202 being configured to perform time-frequency transformation on the scrambled watermarked image frame to obtain scrambled frequency domain data, the scrambled frequency domain data including a matrix formed by scrambled frequency domain coefficients;

a first generation module 1205, configured to generate a scrambled watermark vector based on the scrambled frequency domain data;

a first model module 1206, configured to input the scrambled watermark vector into a watermark extraction model to output scrambled watermark data;

a first loss module 1208, configured to calculate a loss value between the watermark data and the scrambled watermark data by using the watermark data as an actual value; and a first training module 1207, configured to train the watermark extraction model based on the loss value, where the watermark extraction model is configured to output the watermark data based on the inputted vector.

In one embodiment, the first generation module 1205 is configured to generate a scrambled watermark vector at the $i^{th}$ target position based on scramble information and watermark information at the $i^{th}$ target position in the scrambled frequency domain data; and the first generation module 1205 is configured to repeat the foregoing operation to generate k scrambled watermark vectors at the k target positions, where the watermark information includes: a scrambled frequency domain coefficient at the $i^{th}$ target position in the scrambled frequency domain data, scrambled frequency domain coefficients at n target positions around the $i^{th}$ target position, at least one of step sizes of the $i^{th}$ target position and an $(i+1)^{th}$ target position, n being a positive integer, i being a positive integer less than or equal to k.

In one embodiment, the first model module 1206 is configured to input the scrambled watermark vector at the $i^{th}$ target position into the watermark extraction model to output a value of the scrambled watermark data at the $i^{th}$ bit; and the first model module 1206 is configured to repeat the foregoing operation to obtain k values of the scrambled watermark data at the k bits.

In one embodiment, the first scrambling module 1204 is configured to scramble the watermarked video data to obtain the scrambled watermarked video data, the scrambling including at least one of compression, offsetting, or cropping, where the scramble information includes at least one of compression information, offsetting information, or cropping information, the compression information includes at least one of a compression ratio or a compression mode, the offsetting information includes at least one of an offset amount or an offset position, and the cropping information includes at least one of a cropping position or a cropping size.

Figure 20:
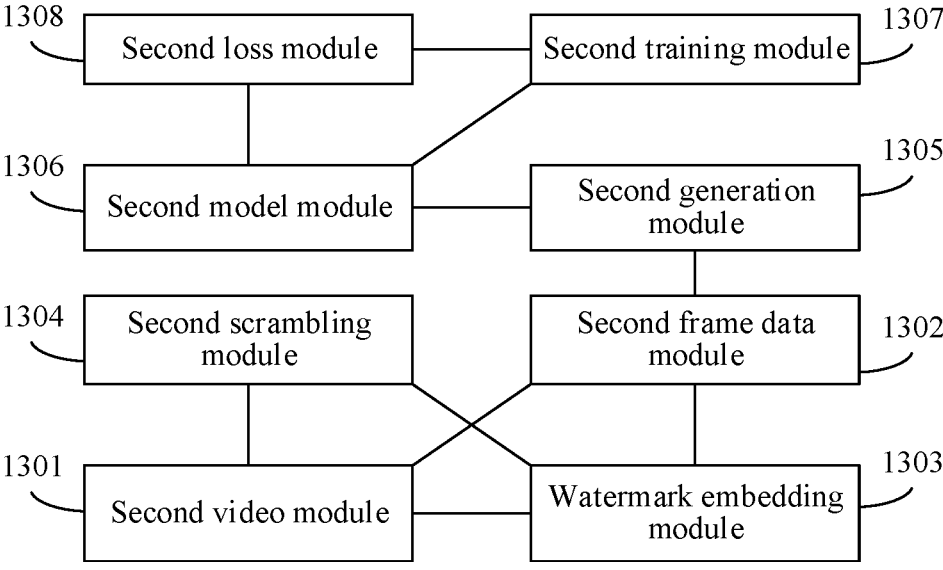
FIG. 20 is a block diagram of a video watermark extraction apparatus according to another exemplary embodiment of this application.

FIG. 20 is a schematic structural diagram of a video watermark embedding apparatus according to an exemplary embodiment of this application. The apparatus may be implemented as an entire computer device or a part of the computer device by using software, hardware, or a combination thereof. The apparatus includes:

a second video module 1301, configured to acquire a watermarked image frame in watermarked video data;

a second frame data module 1302, configured to perform time-frequency transformation on the watermarked image frame to obtain watermarked frequency domain data, the watermarked frequency domain data including a matrix formed by frequency domain coefficients; and a watermark extraction module 1303, configured to extract watermark data according to the frequency domain coefficients in the watermarked frequency domain data.

In one embodiment, the watermark data occupies k bits, and k is a positive integer;

the watermark extraction module 1303 is further configured to determine a value of the watermark data at an $i^{th}$ bit according to a frequency domain coefficient at an $i^{th}$ target position in the watermarked frequency domain data, the $i^{th}$ target position being a position in the matrix corresponding to the it bit, i being a positive integer less than or equal to k; and the watermark extraction module 1303 is further configured to repeat the foregoing operation to obtain values of the watermark data at the k bits.

In one embodiment, the watermark data is binary data;

the watermark extraction module 1303 is further configured to determine the value of the watermark data at the $i^{th}$ bit according to a value range to which the frequency domain coefficient at the $i^{th}$ target position in the watermarked frequency domain data belongs, where the value range is determined according to a value range step size, the value range includes a first value range and a second value range, a value of the watermark data corresponding to the first value range is 0, and a value of the watermark data corresponding to the second value range is 1.

In one embodiment, the watermark extraction module 1303 is further configured to traverse at least two watermarked image frames in the watermarked video data to extract at least two pieces of watermark data; and the watermark extraction module 1303 is further configured to determine final watermark data according to the at least two pieces of watermark data based on a majority principle.

In one embodiment, the watermark data occupies k bits, and k is a positive integer;

the watermark extraction module 1303 is further configured to determine a value that appears most at a $j^{th}$ bit in the at least two pieces of watermark data as a value of the final watermark data at the $j^{th}$ bit, j being a positive integer less than or equal to k; and the watermark extraction module 1303 is further configured to repeat the foregoing operation to obtain values of the final watermark data at the k bits.

In one embodiment, the frame data module is further configured to perform format conversion on an RGB watermarked image frame in the watermarked video data to obtain a YCrCb watermarked image frame in a YCrCb format; and the second frame data module is further configured to determine image data of a Cb channel in the YCrCb watermarked image frame as the watermarked image frame.

In one embodiment, the apparatus further includes:

a second generation module 1305, configured to generate a watermark vector based on the frequency domain coefficients in the watermarked frequency domain data; and a second model module 1306, configured to input the watermark vector into a watermark extraction model to output the watermark data.

In one embodiment, the apparatus further includes:

a second scrambling module 1304, configured to scramble the watermarked video data to obtain scrambled watermarked video data;

the second video module 1301 being configured to acquire a scrambled watermarked image frame in the scrambled watermarked video data;

the second frame data module 1302 being configured to perform time-frequency transformation on the scrambled watermarked image frame to obtain scrambled frequency domain data, the scrambled frequency domain data including a matrix formed by scrambled frequency domain coefficients;

the second generation module 1305 being configured to generate a scrambled watermark vector based on the scrambled frequency domain data;

the second model module 1306 being configured to input the scrambled watermark vector into a watermark extraction model to output scrambled watermark data;

a second loss module 1308, configured to calculate a loss value between the watermark data and the scrambled watermark data by using the watermark data as an actual value; and a second training module 1307, configured to train the watermark extraction model based on the loss value, where the watermark extraction model is configured to output the watermark data based on the inputted vector.

In one embodiment, the second generation module 1305 is configured to generate a scrambled watermark vector at the $i^{th}$ target position based on scramble information and watermark information at the $i^{th}$ target position in the scrambled frequency domain data; and the second generation module 1305 is configured to repeat the foregoing operation to generate k scrambled watermark vectors at the k target positions, where the watermark information includes: a scrambled frequency domain coefficient at the $i^{th}$ target position in the scrambled frequency domain data, scrambled frequency domain coefficients at n target positions around the $i^{th}$ target position, at least one of step sizes of the $i^{th}$ target position and an $(i+1)^{th}$ target position, n being a positive integer, i being a positive integer less than or equal to k.

In one embodiment, the second model module 1306 is configured to input the scrambled watermark vector at the $i^{th}$ target position into the watermark extraction model to output a value of the scrambled watermark data at the $i^{th}$ bit; and the second model module 1306 is configured to repeat the foregoing operation to obtain k values of the scrambled watermark data at the k bits.

In one embodiment, the second scrambling module 1304 is configured to scramble the watermarked video data to obtain the scrambled watermarked video data, the scrambling including at least one of compression, offsetting, or cropping, where the scramble information includes at least one of compression information, offsetting information, or cropping information, the compression information includes at least one of a compression ratio or a compression mode, the offsetting information includes at least one of an offset amount or an offset position, and the cropping information includes at least one of a cropping position or a cropping size.

Figure 21:
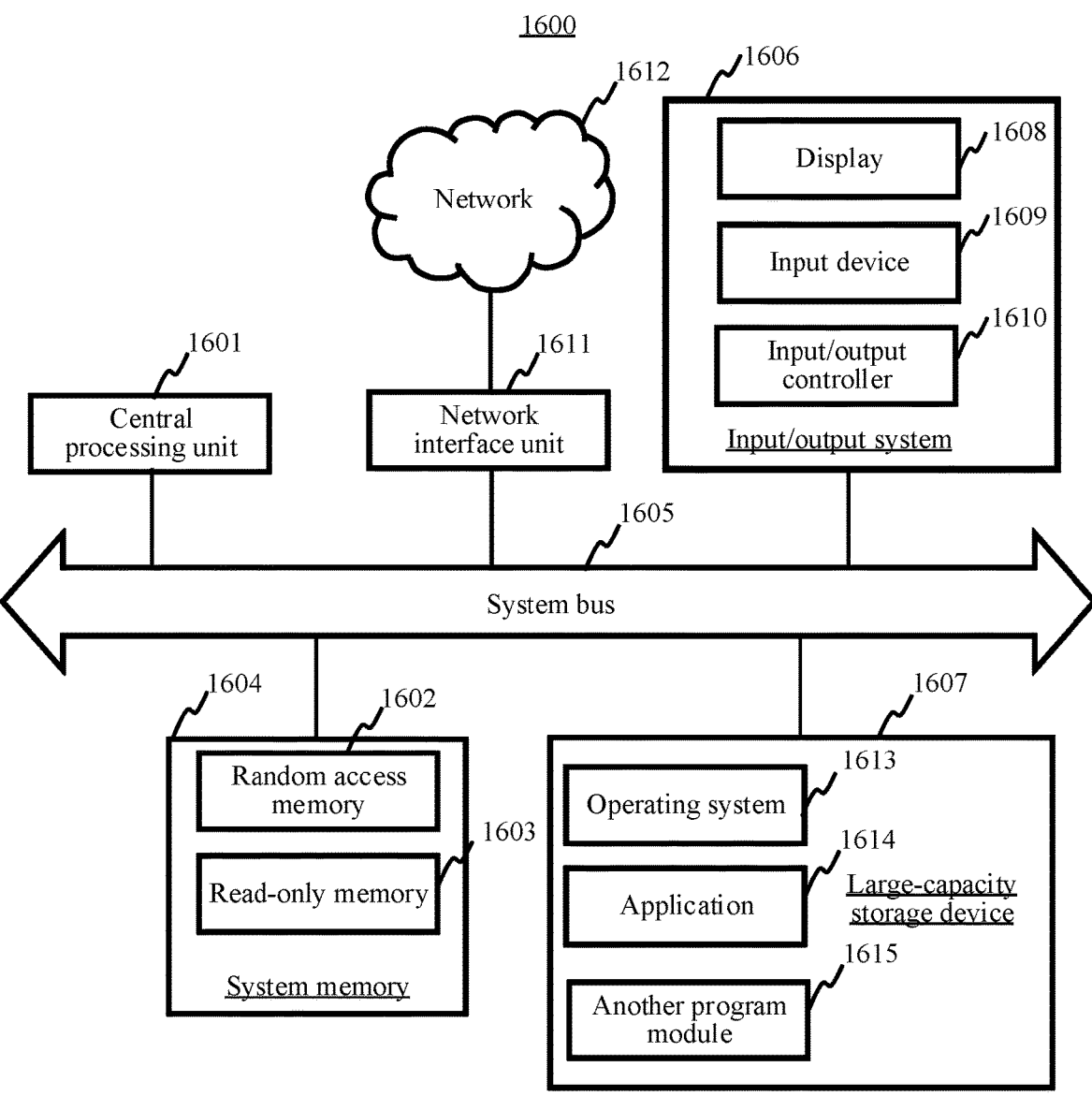
FIG. 21 is a schematic structural diagram of a server according to another exemplary embodiment of this application.

FIG. 21 is a schematic structural diagram of a server according to an embodiment of this application. Specifically, the server 1600 includes a central processing unit (CPU) 1601, a system memory 1604 including a random access memory (RAM) 1602 and a read-only memory (ROM) 1603, and a system bus 1605 connecting the system memory 1604 and the CPU 1601. The server 1600 further includes a basic input/output (I/O) system 1606 assisting in transmitting information between components in the computer, and a mass storage device 1607 configured to store an operating system 1613, an application 1614, and another program module 1615.

The basic I/O system 1606 includes a display 1608 configured to display information and an input device 1609 such as a mouse or a keyboard that is used for inputting information by a user. The display 1608 and the input device 1609 are both connected to the CPU 1601 by using an input/output controller 1610 connected to the system bus 1605. The basic I/O system 1606 may further include the input/output controller 1610 to be configured to receive and process inputs from a plurality of other devices such as a keyboard, a mouse, and an electronic stylus. Similarly, the input/output controller 1610 further provides an output to a display screen, a printer, or another type of output device.

The mass storage device 1607 is connected to the CPU 1601 by using a mass storage controller (not shown) connected to the system bus 1605. The mass storage device 1607 and a computer-readable medium associated with the large-capacity storage device provide non-volatile storage to the server 1600. That is, the mass storage device 1607 may include the computer-readable medium (not shown) such as a hard disk or a Compact Disc Read-Only Memory (CD-ROM) drive.

Generally, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or a solid state drive (SSD), another optical storage, a magnetic cassette, a magnetic tape, a magnetic disk memory, or another magnetic storage device. Certainly, a person skilled in art can know that the computer storage medium is not limited to the foregoing several types. The system memory 1604 and the mass storage device 1607 may be collectively referred to as a memory.

According to the embodiments of this application, the server 1600 may further be connected, through a network such as the Internet, to a remote computer on the network and run. That is, the server 1600 may be connected to a network 1612 by using a network interface unit 1611 connected to the system bus 1605, or may be connected to another type of network or a remote computer system (not shown) by using a network interface unit 1611.

This application further provides a terminal, including a processor and a memory, the memory storing at least one instruction, the at least one instruction being executed by the processor to implement the method for embedding a watermark in video data and the method for extracting a watermark in video data provided in the foregoing method embodiments. The terminal may be a terminal provided in FIG. 22 below.

Figure 22:
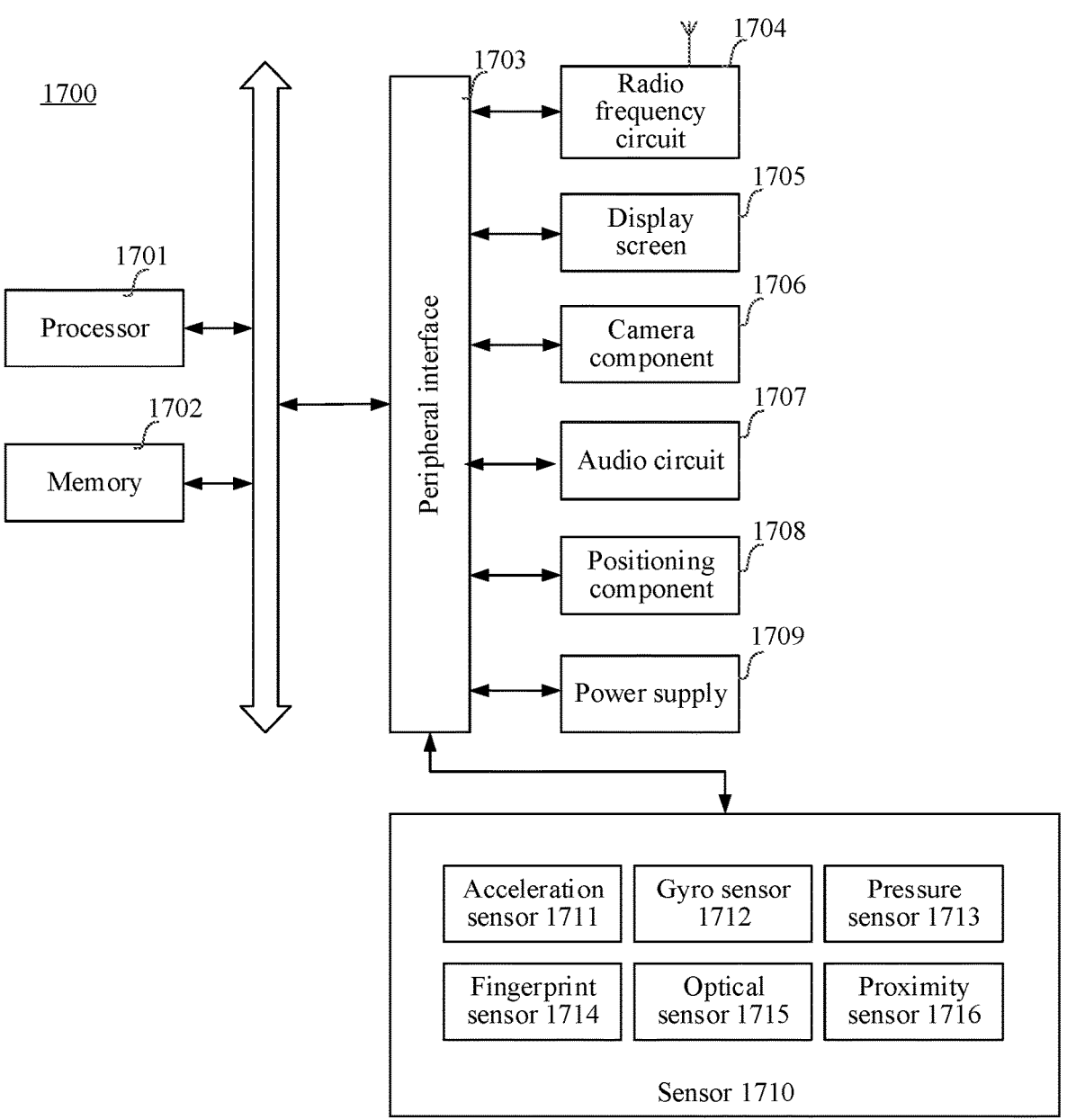
FIG. 22 is a block diagram of an implementation environment according to an exemplary embodiment of this application.

FIG. 22 is a structural block diagram of a terminal 1700 according to an exemplary embodiment of this application. The terminal 1700 may be a smartphone, a tablet computer, an MP3 player, an MP4 player, a notebook computer, or a desktop computer. The terminal 1700 may also be referred to as user equipment, a portable terminal, a laptop terminal, or a desktop terminal, among other names.

Generally, the terminal 1700 includes a processor 1701 and a memory 1702.

The processor 1701 may include one or more processing cores. For example, the processor 1701 may be a 4-core processor or an 8-core processor. The processor 1701 may be implemented in at least one hardware form of a digital signal processor (DSP), a field-programmable gate array (FPGA), and a programmable logic array (PLA). The processor 1701 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1701 may be integrated with a graphics processing unit (GPU).

The GPU is configured to render and draw content that needs to be displayed on a display screen. In some embodiments, the processor 1701 may further include an artificial intelligence (AI) processor. The AI processor is configured to process computing operations related to machine learning.

The memory 1702 may include one or more computer-readable storage media. The computer-readable storage medium may be non-transient. The memory 1702 may further include a high-speed random access memory (RAM) and a nonvolatile memory, for example, one or more disk storage devices or flash storage devices. In some embodiments, the non-transitory computer-readable storage medium in the memory 1702 is configured to store at least one instruction, and the at least one instruction being configured to be executed by the processor 1701 to implement the method for embedding a watermark in video data and the method for extracting a watermark in video data provided in the method embodiments of this application.

In some embodiments, the terminal 1700 may include a peripheral interface 1703 and at least one peripheral. The processor 1701, the memory 1702, and the peripheral interface 1703 may be connected by using a bus or a signal cable. Each peripheral may be connected to the peripheral interface 1703 by using a bus, a signal cable, or a circuit board. Specifically, the peripheral device includes: at least one of a radio frequency (RF) circuit 1704, a touch display screen 1705, a camera assembly 1706, an audio circuit 1707, a positioning component 1708, and a power supply 1709.

In some embodiments, the terminal 1700 further includes one or more sensors 1710. The one or more sensors 1710 include, but are not limited to, an acceleration sensor 1711, a gyroscope sensor 1712, a pressure sensor 1713, a fingerprint sensor 1714, an optical sensor 1715, and a proximity sensor 1716.

A person skilled in the art can understand that the structure shown in FIG. 22 does not constitute the limitation to the terminal 1700, more or fewer assemblies may be included as compared with those shown in the figure, some assemblies may be combined, or different assemblies may be adopted for arrangement.

The memory further includes one or more programs. The one or more programs are stored in the memory. The one or more programs include the method for embedding a watermark in video data and the method for extracting a watermark in video data provided in the embodiments of this application.

This application further provides a computer device. The computer device includes a processor and a memory. The memory stores at least one instruction, at least one program, a code set or an instruction set. The at least one instruction, the at least one program, the code set, or the instruction set is loaded or executed by the processor to implement the method for embedding a watermark in video data in the foregoing aspects.

This application further provides a computer-readable storage medium, the storage medium storing at least one instruction, at least one program, a code set or an instruction set, the at least one instruction, the at least one program, the code set, or the instruction set being loaded or executed by a processor to implement the method for embedding a watermark in video data in the foregoing aspects.

This application further provides a computer program product or a computer program. The computer program product or the computer program includes computer instructions, and the computer instructions are stored in a computer-readable storage medium. The processor of the computer device reads the computer instructions from the computer-readable storage medium, and the computer instructions, when being executed by the processor, cause the computer device to perform the method for embedding a watermark in video data provided in the foregoing example embodiments.

This application further provides a computer device. The computer device includes a processor and a memory. The memory stores at least one instruction, at least one program, a code set or an instruction set. The at least one instruction, the at least one program, the code set, or the instruction set is loaded or executed by the processor to implement the method for extracting a watermark in video data in the foregoing aspects.

This application further provides a computer-readable storage medium, the storage medium storing at least one instruction, at least one program, a code set or an instruction set, the at least one instruction, the at least one program, the code set, or the instruction set being loaded or executed by a processor to implement the method for extracting a watermark in video data in the foregoing aspects.

This application further provides a computer program product or a computer program. The computer program product or the computer program includes computer instructions, and the computer instructions are stored in a computer-readable storage medium. The processor of the computer device reads the computer instructions from the computer-readable storage medium, and the computer instructions, when being executed by the processor, cause the computer device to perform the method for extracting a watermark in video data provided in the foregoing example embodiments.

It is to be understood that "a plurality of" mentioned in this specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely example embodiments of this application, but are not intended to limit this application. Any modification, equivalent replacement, or improvement made within the spirit and principle of this application shall fall within the protection scope of this application.

What is claimed is:

1. A method for embedding a watermark in video data, applied to a computer device, the method comprising:
  converting a format of an original image frame in video data to obtain a YCrCb original image frame in a YCrCb format;
  converting image data of a Cb channel in the YCrCb original image frame from an integer type to a floating-point type;
  acquiring a target image frame comprising the image data of the Cb channel in the YCrCb original image frame in the floating-point type;
  performing time-frequency transformation on the target image frame to obtain target frequency domain data, the target frequency domain data comprising a matrix formed by frequency domain coefficients;
  changing the frequency domain coefficients in the target frequency domain data according to watermark data to obtain watermarked frequency domain data;
  performing inverse time-frequency transformation on the watermarked frequency domain data to obtain a watermarked image frame;
  synthesizing a YCrCb watermarked image frame from the watermarked image frame and image data of a Y channel and a Cr channel in the YCrCb original image frame;
  converting a format of the YCrCb watermarked image frame to obtain an RGB watermarked image frame in an RGB format; and
  synthesizing watermarked video data according to the RGB watermarked image frame.

2. The method according to claim 1, wherein the watermark data occupies k bits, and k is a positive integer; and
  the changing the frequency domain coefficients in the target frequency domain data according to watermark data to obtain watermarked frequency domain data comprises:
  changing a frequency domain coefficient at an $i^{th}$ target position in the frequency domain data according to a value of the watermark data at an $i^{th}$ bit, the $i^{th}$ target position being a position in the matrix corresponding to the $i^{th}$ bit, i being a positive integer less than or equal to k; and
  repeating the foregoing operation to change frequency domain coefficients at k target positions in the frequency domain data.

3. The method according to claim 2, wherein the watermark data is binary data; and
  the changing a frequency domain coefficient at an $i^{th}$ target position in the frequency domain data according to a value of the watermark data at an $i^{th}$ bit comprises:
  determining a first value range of frequency domain coefficients corresponding to 0 in the binary data and a second value range of frequency domain coefficients corresponding to 1 in the binary data according to a value range step size; and
  changing the frequency domain coefficient at the $i^{th}$ target position in the frequency domain data to a value in the first value range in response to the value of the watermark data at the $i^{th}$ bit being 0, i being a positive integer less than or equal to k; or
  changing the frequency domain coefficient at the $i^{th}$ target position in the frequency domain data to a value in the second value range in response to the value of the watermark data at the $i^{th}$ bit being 1.

4. The method according to claim 3, wherein the first value range comprises at least one first value interval, the second value range comprises at least one second value interval, and interval lengths of the first value interval and the second value interval are equal to the value range step size;
  changing the frequency domain coefficient at the $i^{th}$ target position in the frequency domain data to a value in the first value range in response to the value of the watermark data at the $i^{th}$ bit being 0 comprises:
  changing the frequency domain coefficient at the $i^{th}$ target position in the frequency domain data to a midpoint value of a first value interval closest to the frequency domain coefficient in response to the value of the watermark data at the $i^{th}$ bit being 0, i being a positive integer less than or equal to k; and the changing the frequency domain coefficient at the $i^{th}$ target position in the frequency domain data to a value in the second value range in response to the value of the watermark data at the $i^{th}$ bit being 1 comprises:

changing the frequency domain coefficient at the $i^{th}$ target position in the frequency domain data to a midpoint value of a second value interval closest to the frequency domain coefficient in response to the value of the watermark data at the $i^{th}$ bit being 1.

5. The method according claim 2, the method further comprising:

scrambling the watermarked video data to obtain scrambled watermarked video data;

acquiring a scrambled watermarked image frame in the scrambled watermarked video data;

performing time-frequency transformation on the scrambled watermarked image frame to obtain scrambled frequency domain data, the scrambled frequency domain data comprising a matrix formed by scrambled frequency domain coefficients;

generating a scrambled watermark vector based on the scrambled frequency domain data;

inputting the scrambled watermark vector into a watermark extraction model to output scrambled watermark data;

calculating a loss value between the watermark data and the scrambled watermark data based on the watermark data; and training the watermark extraction model based on the loss value, wherein the watermark extraction model is configured to output the watermark data based on the inputted vector.

6. The method according to claim 5, wherein the generating a scrambled watermark vector based on the scrambled frequency domain data comprises:

generating a scrambled watermark vector at the $i^{th}$ target position based on scramble information and watermark information at the $i^{th}$ target position in the scrambled frequency domain data; and repeating the foregoing operation to generate k scrambled watermark vectors at the k target positions, wherein the watermark information comprises a scrambled frequency domain coefficient at the $i^{th}$ target position in the scrambled frequency domain data, scrambled frequency domain coefficients at n target positions around the $i^{th}$ target position, at least one of step sizes of the $i^{th}$ target position and an $(i+1)^{th}$ target position, n being a positive integer, i being a positive integer less than or equal to k.

7. The method according to claim 6, wherein the inputting the scrambled watermark vector into a watermark extraction model to output scrambled watermark data comprises:

inputting the scrambled watermark vector at the $i^{th}$ target position into the watermark extraction model to output a value the scrambled watermark data at the $i^{th}$ bit; and repeating the foregoing operation to obtain k values of the scrambled watermark data at the k bits.

8. The method according to claim 6, wherein the scrambling the watermarked video data to obtain scrambled watermarked video data comprises:

scrambling the watermarked video data to obtain the scrambled watermarked video data, the scrambling comprising at least one of compression, offsetting, or cropping, wherein the scramble information comprises at least one of compression information, offsetting information, or cropping information, the compression information comprises at least one of a compression ratio or a compression mode, the offsetting information comprises at least one of an offset amount or an offset position, and the cropping information comprises at least one of a cropping position or a cropping size.

9. A method for extracting a watermark in video data, applied to a computer device, the method comprising:

converting format of an RGB watermarked image frame in watermarked video data to obtain a YCrCb watermarked image frame in a YCrCb format;

converting image data of a Cb channel in the YCrCb watermarked image frame from an integer type to a floating-point type;

acquiring a watermarked image frame comprising the image data of the Cb channel in the YCrCb watermarked image frame in the floating-point type;

performing time-frequency transformation on the watermarked image frame to obtain watermarked frequency domain data, the watermarked frequency domain data comprising a matrix formed by frequency domain coefficients; and extracting watermark data according to the frequency domain coefficients in the watermarked frequency domain data.

10. The method according to claim 9, wherein the watermark data occupies k bits, and k is a positive integer; and the extracting watermark data according to the frequency domain coefficients in the watermarked frequency domain data comprises:

determining a value of the watermark data at an $i^{th}$ bit according to a frequency domain coefficient at an $i^{th}$ target position in the watermarked frequency domain data, the $i^{th}$ target position being a position in the matrix corresponding to the $i^{th}$ bit, i being a positive integer less than or equal to k; and repeating the foregoing operation to obtain values of the watermark data at the k bits.

11. The method according to claim 10, wherein the watermark data is binary data; and the determining a value of the watermark data at an $i^{th}$ bit according to a frequency domain coefficient at an $i^{th}$ target position in the watermarked frequency domain data comprises:

determining the value of the watermark data at the $i^{th}$ bit according to a value range to which the frequency domain coefficient at the $i^{th}$ target position in the watermarked frequency domain data belongs, wherein the value range is determined according to a value range step size, the value range comprises a first value range and a second value range, a value of the watermark data corresponding to the first value range is 0, and a value of the watermark data corresponding to the second value range is 1.

12. The method according to claim 9, the method further comprising:

traversing at least two watermarked image frames in the watermarked video data to extract at least two pieces of watermark data; and determining final watermark data according to the at least two pieces of watermark data based on a majority principle, wherein the watermark data occupies k bits, and k is a positive integer; and the determining final watermark data according to the at least two pieces of watermark data based on a majority principle comprises determining a value that appears most at a $j^{th}$ bit in the at least two pieces of watermark data as a value of the final watermark data at the $j^{th}$ bit, j being a positive integer less than or equal to k; and repeating the foregoing operation to obtain values of the final watermark data at the k bits.

13. The method according to claim 10, wherein the extracting watermark data according to the frequency domain coefficients in the watermarked frequency domain data comprises:

generating a watermark vector based on the frequency domain coefficients in the watermarked frequency domain data; and inputting the watermark vector into a watermark extraction model to output the watermark data.

14. The method according to claim 13, wherein the watermark extraction model is obtained through training using the following method:

scrambling the watermarked video data to obtain scrambled watermarked video data;

acquiring a scrambled watermarked image frame in the scrambled watermarked video data;

performing time-frequency transformation on the scrambled watermarked image frame to obtain scrambled frequency domain data, the scrambled frequency domain data comprising a matrix formed by scrambled frequency domain coefficients;

generating a scrambled watermark vector based on the scrambled frequency domain data;

inputting the scrambled watermark vector into a watermark extraction model to output scrambled watermark data;

calculating a loss value between the watermark data and the scrambled watermark data based on the watermark data; and training the watermark extraction model based on the loss value, wherein the watermark extraction model is configured to output the watermark data based on the inputted vector.

15. The method according to claim 14, wherein the generating a scrambled watermark vector based on the scrambled frequency domain data comprises:

generating a scrambled watermark vector at the $i^{th}$ target position based on scramble information and watermark information at the $i^{th}$ target position in the scrambled frequency domain data; and repeating the foregoing operation to generate k scrambled watermark vectors at k target positions, wherein the watermark information comprises: a scrambled frequency domain coefficient at the $i^{th}$ target position in the scrambled frequency domain data, scrambled frequency domain coefficients at n target positions around the $i^{th}$ target position, at least one of step sizes of the $i^{th}$ target position and an $(i+1)^{th}$ target position, n being a positive integer, i being a positive integer less than or equal to k.

16. The method according to claim 15, wherein the inputting the scrambled watermark vector into a watermark extraction model to output scrambled watermark data comprises:

inputting the scrambled watermark vector at the $i^{th}$ target position into the watermark extraction model to output a value of the scrambled watermark data at the $i^{th}$ bit; and repeating the foregoing operation to obtain k values of the scrambled watermark data at the k bits.

17. A non-transitory computer-readable storage medium, the storage medium storing at least one instruction, at least one program, a code set or an instruction set, the at least one instruction, the at least one program, the code set, or the instruction set being loaded or executed by a processor to implement the method for extracting a watermark in video data, comprising:

converting format of an RGB watermarked image frame in watermarked video data to obtain a YCrCb watermarked image frame in a YCrCb format;

converting image data of a Cb channel in the YCrCb watermarked image frame from an integer type to a floating-point type;

acquiring a watermarked image frame comprising the image data of the Cb channel in the YCrCb watermarked image frame in the floating-point type;

performing time-frequency transformation on the watermarked image frame to obtain watermarked frequency domain data, the watermarked frequency domain data comprising a matrix formed by frequency domain coefficients; and extracting watermark data according to the frequency domain coefficients in the watermarked frequency domain data.

\* \* \* \* \*